United States Patent
Krantz

(10) Patent No.: US 12,126,942 B2
(45) Date of Patent: Oct. 22, 2024

(54) ACTIVE CAMOUFLAGE DETECTION SYSTEMS AND METHODS

(71) Applicant: Teledyne FLIR Defense, Inc., Wilsonville, OR (US)

(72) Inventor: Jason Krantz, Wilsonville, OR (US)

(73) Assignee: Teledyne FLIR Defense, Inc., Wilsonville, OR (US)

( * ) Notice: Subject to any disclaimer, the term of this patent is extended or adjusted under 35 U.S.C. 154(b) by 887 days.

(21) Appl. No.: 17/063,631

(22) Filed: Oct. 5, 2020

(65) Prior Publication Data

US 2024/0314272 A1    Sep. 19, 2024

Related U.S. Application Data

(60) Provisional application No. 62/916,619, filed on Oct. 17, 2019.

(51) Int. Cl.
| | |
|---|---|
| *G01S 13/86* | (2006.01) |
| *G01S 17/89* | (2020.01) |
| *G03B 15/00* | (2021.01) |
| *G06V 20/13* | (2022.01) |

(Continued)

(52) U.S. Cl.
CPC ............ *H04N 7/185* (2013.01); *G01S 13/86* (2013.01); *G01S 13/867* (2013.01); *G01S 17/89* (2013.01); *G03B 15/006* (2013.01); *G06V 20/13* (2022.01); *H04N 23/20* (2023.01)

(58) Field of Classification Search
CPC ........ H04N 7/185; H04N 23/20; G01S 13/86; G01S 13/867; G01S 17/89; G03B 15/006; G06V 20/13
See application file for complete search history.

(56) References Cited

U.S. PATENT DOCUMENTS

| | | |
|---|---|---|
| 2,403,722 A | 7/1946 | Jelley et al. |
| 6,370,260 B1 | 4/2002 | Pavlidis et al. |

(Continued)

OTHER PUBLICATIONS

Mayer, Rulon et al., "Detection of Camouflaged Targets in Cluttered Backgrounds using Fusion of Near Simultaneous Spectral and Polarimetric Imaging", Sensors and Data Analysis Section, Code 5621, Advanced Concepts Branch, Optical Sciences Division, Naval Research Laboratory, pp. 499-506, Aug. 9, 2000, Washington, DC.

(Continued)

*Primary Examiner* — David P Porta
*Assistant Examiner* — Mamadou Faye
(74) *Attorney, Agent, or Firm* — Haynes and Boone, LLP

(57) ABSTRACT

Camouflage detection systems and related techniques are provided to improve the detection of camouflaged targets, including targets employing active thermal camouflage techniques. A camouflage detection system includes an imaging system and a logic device configured to communicate with the imaging system and a supplemental sensor system. The imaging system includes an infrared imaging module configured to provide infrared and/or thermal image data of a scene including a camouflaged target. The logic device is configured to receive infrared image data and supplemental sensor data, determine an estimated target spatial profile, and determine one or more target profile anomalies based, at least in part, on the estimated target spatial profile.

20 Claims, 8 Drawing Sheets

(51) Int. Cl.
  *H04N 7/18* (2006.01)
  *H04N 23/20* (2023.01)

(56) References Cited

U.S. PATENT DOCUMENTS

| | | | | |
|---|---|---|---|---|
| 6,422,508 | B1* | 7/2002 | Barnes | G01J 3/06 |
| | | | | 342/63 |
| 7,076,088 | B2 | 7/2006 | Pavlidis | |
| 2009/0290757 | A1* | 11/2009 | Mian | G06V 20/653 |
| | | | | 382/104 |
| 2016/0266273 | A1* | 9/2016 | Wurzbach | G01V 5/0025 |

OTHER PUBLICATIONS

Goldberg, A.C. et al., "Multispectral, Hyperspectral, and Three-Dimensional Imaging Research at the U.S. Army Research Laboratory", U.S. Army Research Laboratory, 17 pages, 2003, Adelphi, MD.

"Camouflaged Object Detection," Web page <http://www.polarissensor.com/applications/defense/camouflaged-object-detection/>, Polaris Sensor Technologies, Inc., 3 pages, Aug. 14, 2019, retrieved from Internet Archive Wayback Machine <https://web.archive.org/web/20190814043606/http://www.polarissensor.com/applications/defense/camouflaged-object-detection/> on Nov. 1, 2022.

Mangale, Supriya et al., "Camouflaged Target Detection and tracking using thermal infrared and visible spectrum imaging," The International Symposium on Intelligent Systems Technologies and Applications, pp. 193-207, Sep. 2016, Jaipur, India.

Schechter, Erik, "Whatever Happened to Counter-Infrared Camouflage?" Web page <https://www.popularmechanics.com/military/research/a9172/whatever-happened-to-counter-infrared-camouflage-15648261/>, Popular Mechanics, 6 pages, Jul. 1, 2013.

Web page <https://saab.com/globalassets/scaled/570x320x80/commercial-land-force-protection-signature-management-mcs/1140-thermal-png.jpg>, 1 page, Sep. 15, 2019, retrieved from Internet Archive Wayback Machine <https://web.archive.org/web/20190915205252/https://saab.com/globalassets/scaled/570x320x80/commercial-land-force-protection-signature-management-mcs/1140-thermal-png.jpg> on Oct. 26, 2022.

* cited by examiner

ACTIVE CAMOUFLAGE DETECTION SYSTEMS AND METHODS

CROSS REFERENCE TO RELATED APPLICATIONS

This application claims the benefit of and priority to U.S. Provisional Patent Application No. 62/916,619 filed Oct. 17, 2019 and entitled "ACTIVE CAMOUFLAGE DETECTION SYSTEMS AND METHODS," which is incorporated herein by reference in its entirety.

TECHNICAL FIELD

The present invention relates generally to camouflage detection and, more particularly, to systems and methods for detecting active camouflage, including active thermal camouflage.

BACKGROUND

Modern camouflage detection systems often rely on thermal imaging to identify stationary or mobile camouflaged or otherwise hidden targets. However, new active camouflage systems are able to employ various thermal masking techniques that can make a relatively large tactical vehicle, such as a tank, appear to have a thermal spatial profile similar to that of a common non-tactical passenger vehicle, such as a pickup truck. Moreover, while modern mobile sensor platforms, such as assisted or autopiloted manned and unmanned terrestrial vehicles and aircraft, including unmanned aerial vehicles (UAVs), remotely operated underwater vehicles (ROVs), unmanned (water) surface vehicles (USVs), and unmanned ground vehicles (UGVs), any of which may be configured as unmanned sensor platforms, are able to operate over long distances and in all environments, conventional camouflage detection systems are often either too expensive and bulky or lack sufficient accuracy under relatively common environmental conditions to be used for reliable camouflage detection and/or safe avoidance navigation of a vehicle or other mobile platform. Thus, there is a need for compact sensor systems and related techniques to provide scene evaluation for reliable camouflage detection and for use with navigation of mobile platforms.

SUMMARY

Camouflage detection systems and related techniques are provided to improve the detection of camouflaged targets, including targets employing active thermal camouflage techniques. One or more embodiments of the described camouflage detection systems may advantageously include an imaging system including an infrared or thermal imaging module, other spectral imaging modules, and/or a multispectral imaging module, a communication module configured to establish a wireless communication link with a base station associated with a mobile platform (e.g., when the camouflage system is coupled to a mobile platform), an orientation and/or position sensor configured to measure orientations and/or positions of the imaging system and/or a coupled mobile platform, a controller to control operation of the communication module, the orientation and/or position sensor, and/or the mobile platform, and one or more additional sensors to measure and provide sensor data corresponding to maneuvering and/or other operation of the mobile platform.

In various embodiments, such additional sensors may include a remote sensor system configured to capture sensor data of a survey area from which a two and/or three-dimensional spatial map of the survey area may be generated. For example, the navigation system may include one or more visible spectrum, infrared, and/or ultraviolet cameras, one or more ranging sensor systems (e.g., lidar, radar, sonar), and/or other remote sensor systems, which may be coupled to a mobile platform. A mobile platform may generally be a flight platform (e.g., a manned aircraft, a UAS, and/or other flight platform), a terrestrial platform (e.g., a motor vehicle), or a water born platform (e.g., a watercraft or submarine).

In one embodiment, a system includes an imaging system, wherein the imaging system comprises an infrared imaging module configured to provide infrared image data of a scene including a camouflaged target in view of the imaging system, and a logic device configured to communicate with the imaging system and a supplemental sensor system configured to provide supplemental sensor data of the scene. The logic device may be configured to receive the infrared image data of the scene from the imaging system and the supplemental sensor data of the scene from the supplemental sensor system, to determine an estimated target spatial profile corresponding to the camouflaged target based, at least in part, on the infrared image data of the scene, and to determine one or more target profile anomalies based, at least in part, on the estimated target spatial profile and the supplemental sensor data of the scene.

In another embodiment, a method includes receiving infrared image data and supplemental sensor data of a scene including a camouflaged target from an imaging system comprising an infrared imaging module configured to provide the infrared image data and from a supplemental sensor system configured to provide the supplemental sensor data, determining an estimated target spatial profile corresponding to the camouflaged target based, at least in part, on the infrared image data of the scene, and determining one or more target profile anomalies based, at least in part, on the estimated target spatial profile and the supplemental sensor data of the scene.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
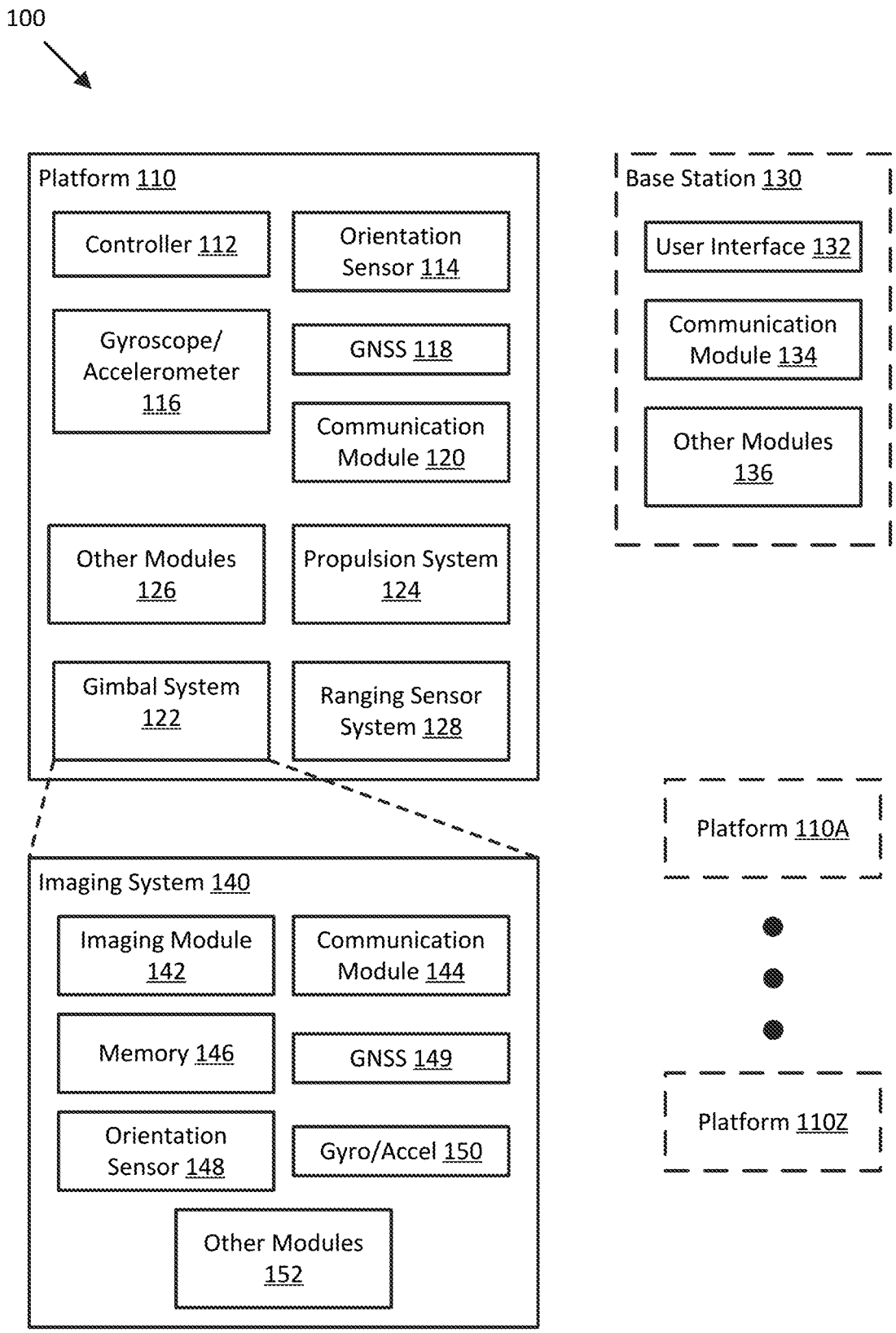
FIG. 1 illustrates a diagram of a camouflage detection system in accordance with an embodiment of the disclosure.

Camouflage detection systems and related techniques are provided to improve the detection of camouflaged targets, including targets employing active thermal camouflage techniques. Currently, camouflage systems are available to camouflage objects in the infrared spectrum, including the thermal spectrum. Typically applied to vehicles, these camouflage systems use active heating/cooling panels to allow tactical vehicles (e.g., tanks) to blend into background thermal radiation. Such camouflage systems can also be used to mimic the thermal signature of other, non-tactical vehicles, for example, or stationary objects such as buildings.

Embodiments described herein provide countermeasures against active camouflage of any kind by combining sensor data from two or more spectra and/or two or more spatial perspectives via a single spectrum or multiple spectra. Such techniques are able to detect anomalies associated with camouflaged targets that may not be reliably detectable in single spectrum and/or perspective images. For example, a large flat plate can be an ideal canvas for active infrared/thermal camouflage. It is often easy to generate a profile of a smaller vehicle or simply the thermal background using such plate in such a way that an operator looking at a camouflaged target through a thermal imager sees a nontactical vehicle or just the thermal background. However, a large plate may often be easily picked out in other spectra- whether lidar, ultraviolet imaging, radar, sonar, or even simply the human visual spectrum.

As described herein, embodiments provide systems and methods for detecting active infrared camouflage by comparing an apparent vehicle profile area (e.g., a first or infrared-based estimated target spatial profile), as identified in infrared image data provided by an infrared imaging module, to a second estimated target spatial profile/profile area identified in other sensor data provided by another sensor (e.g., a supplemental sensor system). For example, a gimbal with both an infrared sensor and a laser designator/rangefinder may pick up the thermal signature of what seems to be a pickup truck with an empty bed. If the pickup truck is at a range of approximately 1000 meters, the area immediately above the bed will typically be at a substantially different range than the pickup truck itself. However, if the laser rangefinder determines that some of the area around the infrared image spatial profile is at the same approximate range as the pickup truck itself, that may indicate a tank or other relatively large tactical vehicle using thermal camouflage to disguise itself as the pickup truck.

In some embodiments, a system operator may manually select areas of a thermal image to interrogate or scan with the laser rangefinder. In other embodiments, the system may be configured to scan the laser rangefinder across an area depicted in a thermal image to proactively seek out any portions of the thermal image that appear in the thermal band to be background but are at a suspiciously uniform range from the sensor and spatially and/or texturally differentiated from the background.

More generally, embodiments provide systems and methods for detecting camouflaged targets by comparing spectrally and/or perspectively differentiated sets of sensor data. Such comparison can identify target profile anomalies, such as regions of sensor data that appear to be a small, contoured vehicle in a first set of sensor data but a relatively flat plate in a second set of sensor data, and embodiments can present target profile anomalies to an operator and/or help make target detection and selection easier. For example, an operator may be an individual soldier or a team of soldiers, for example, or a targeting system (e.g., for a sensor or tactical/weapon system). Embodiments of the disclosed camouflage detection system may present a set of target profile anomalies to such targeting system, which may then forward the target profile anomalies (e.g., modified or unmodified, based on various target and/or target posture identification techniques) to a soldier, a team of soldiers, or yet another automated system.

Embodiments described herein may be implemented by existing sensor platforms. For example, an infrared imaging/targeting pod (incorporating an infrared imaging sensor and a laser designator and/or laser rangefinder) could be configured to use its laser designator/rangefinder to create a lidar-like image of an estimated target spatial profile or region identified in infrared image data provided by the infrared sensor. Similarly, an aircraft equipped with both radar and an infrared sensor could compare radar returns from a target identified in infrared image data (e.g., corresponding roughly to a pickup truck) to the expected return from such a vehicle. If a discrepancy is detected between the thermal image based estimated target spatial profile and the estimated target spatial profile derived from the radar returns, embodiments described herein may highlight such target profile anomalies in a display view for the soldier operating the thermal imaging device (or tagged in a data set provided to a targeting system), prompting closer inspection.

As described herein, a rangefinder could be used to detect thermal camouflage. If a mobile or stationary target employing active thermal camouflage blends into the thermal background image, it will be hard to see with an infrared image alone. But even a simple rangefinder could identify a region of the thermal background which is at a starkly different distance from the rest of the background, revealing the true profile of the camouflaged object. As such, embodiments described herein may be configured to scan a rangefinder across portions of an imaged scene and detect target profile anomalies corresponding to relatively uniform and/or otherwise differentiated ranging sensor data without corresponding features in thermal image data of the scene.

In additional embodiments, two or more sensors with different positions relative to/perspectives of the same scene may be compared to detect such target profile anomalies. Such sensors may be the same type of sensor, for example, or may be implemented by multiple different types of sensors. For example, if one UAV provides image data apparently of a pickup truck in profile, another UAV or USV positioned to provide a different perspective (e.g., according to a different absolute bearing relative to the camouflaged target) may expect to image the same target from a front ¾ view and detect the same pickup truck. By comparing the images from each platform, embodiments are able to detect any unphysical "flattening" of the spatial profile of the target pickup truck from one perspective or another and highlight a corresponding region of the image(s).

In various embodiment, a camouflage detection system as described herein may use a target model database (e.g., of vehicle images/spectrums/profiles acquired from many angles), which may facilitate the detection and/or identification of a particular vehicle that looked like one type of vehicle from one angle but "flat" or otherwise anomalous from another angle. For example, embodiments may employ machine learning techniques to generate and/or use such target model database to determine an estimated target spatial profile (e.g., based on sensor data of a scene), for example, and/or to identify a particular type of vehicle (e.g., a target model dataset) represented in the target model database. In some embodiments, the described system may record the time and coordinates of a suspected but non-verified target spatial profile of a T-72 tank. If ground troops or a future damage assessment verifies that the object in question was, in fact, a T-72 tank, that fact could be recorded and used to improve the target model database of thermal profiles, making automated target spatial profile estimation and/or target identification more accurate.

In still further embodiments, the disclosed camouflage detection system may correlate images from multiple sensors, including imaging systems that aren't in active use. To do this, the system could record a snapshot of sensor data from all relevant sensors, including those not actively involved in a target profile comparison. For example, if using lidar and infrared imaging to detect a target employing active thermal camouflage, the system might record radar data at that moment. Non-active sensor data sets could then be used to improve the rate of useful anomaly detection by identifying unanticipated correlations in all available sensor data (e.g., through non-time critical sensor data processing and related temporal and/or spatial correlation identification).

Embodiments of a camouflage detection system may be implemented with one or multiple different imaging systems, for example, and/or with a multispectral imaging system, as described herein. For example, scenes presented to an imaging navigation system often include areas with very different near-infrared (NIR), visible (VIS), and long-wave UV (LWUV) spectral content. A multispectral imaging system that is sensitive to spectrums beyond the visible can more reliably determine the composition of scene content, including being able to reliably differentiate sky from other vehicles, trees, shrubbery, structures, or a roadway, for example. A multispectral imaging system can therefore feed a camouflage detection system with a much more nuanced data stream.

In addition, multispectral imaging systems may be made relatively compactly, thereby reducing size, weight, and power requirements (relative to conventional systems), and are therefore suitable for deployment in various applications such as relatively small unmanned terrestrial vehicles and aircraft systems. Modern manned and unmanned mobile platforms, including unmanned sensor platforms, such as unmanned aerial vehicles (UAVs), remotely operated underwater vehicles (ROVs), unmanned (water) surface vehicles (USVs), and unmanned ground vehicles (UGVs), are able to operate over long distances and in all environments. Such systems typically rely on a portable power source that can limit their range of travel. Embodiments described herein provide relatively lightweight, compact, and featureful camouflage detection systems that typically increase the achievable range of such mobile platforms, including unmanned sensor platforms, which can be particularly helpful when attempting to monitor a survey area relatively quickly and exhaustively.

In various embodiments, imagery and/or other sensor data may be transmitted to a base station, either in real-time or after a survey, which may be configured to combine the sensor data with a map or floor plan of a survey area to present the sensor data in a survey map over the spatial extents of the map or floor plan. Such map or floor plan may be two or three dimensional. The survey map may be stored at the base station and, if the base station includes a display, be presented in real time as a graphically overlaid map to an operator/user.

FIG. 1 illustrates a block diagram of camouflage detection system 100 in accordance with an embodiment of the disclosure. In some embodiments, system 100 may be configured to fly over a scene, through a structure, or approach a target and image or sense the scene, structure, or target, or portions thereof, using gimbal system 122 to aim imaging system/sensor payload 140 and/or platform 110 to aim ranging sensor system 128 at the scene, structure, or target, or portions thereof. Resulting imagery and/or other sensor data may be processed (e.g., byسensor payload 140, platform 110, and/or base station 130) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis. In some embodiments, system 100 may be configured to use such imagery and/or other sensor data to control operation of platform 110, sensor payload 140, and/or ranging sensor system 128, as described herein, such as controlling gimbal system 122 to aim sensor payload 140 towards a particular direction or controlling propulsion system 124 to move and/or orient platform 110 to a desired position/orientation in a scene or structure or relative to a target.

In the embodiment shown in FIG. 1, camouflage detection system 100 includes platform 110, optional base station 130, at least one imaging system 140, and one or more optional additional platforms 100A-Z. Platform 110 (e.g., and any one of platforms 110A-Z) may be a mobile platform configured to move or fly and/or position imaging system 140 and/or ranging sensor system 128 (e.g., relative to a designated or detected target). As shown in FIG. 1, platform 110 may include one or more of a controller 112, an orientation sensor 114, a gyroscope/accelerometer 116, a global navigation satellite system (GNSS) 118, a communication module 120, a gimbal system 122, a propulsion system 124, a ranging sensor system 128, and other modules 126. Operation of platform 110 may be substantially autonomous and/or partially or completely controlled by optional base station 130, which may include one or more of a user interface 132, a communication module 134, and other modules 136. In other embodiments, platform 110 may include one or more of the elements of base station 130, such as with various types of manned aircraft, terrestrial vehicles, and/or surface or subsurface watercraft.

Sensor payload 140 and/or ranging sensor system 128 may be physically coupled to platform 110 and be configured to capture sensor data (e.g., visible spectrum images, infrared images, ultraviolet images, radar data, sonar data, lidar data, laser rangefinder data, and/or other ranging and/or other remote sensor data) of a scene, target, target position, area, and/or object(s) as selected and/or framed by operation of platform 110 and/or base station 130. In some embodiments, one or more of the elements of system 100 may be implemented in a combined housing or structure that can be coupled to or within platform 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of platform 110 and/or other elements of system 100, for example. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 112 may be integrated with one or more other elements of platform 110, for example, or distributed as multiple logic devices within platform 110, base station 130, and/or sensor payload 140.

In some embodiments, controller 112 may be configured to substantially continuously monitor and/or store the status of and/or sensor data provided by one or more elements of platform 110, sensor payload 140, ranging sensor system 128, and/or base station 130, such as the position and/or orientation of platform 110, sensor payload 140, and/or base station 130, for example, and the status of a communication link established between platform 110, sensor payload 140, ranging sensor system 128, and/or base station 130. Such communication links may be configured to be established and then transmit data between elements of system 100 substantially continuously throughout operation of system 100, where such data includes various types of sensor data, control parameters, and/or other data.

Orientation sensor 114 may be implemented as one or more of a compass, float, accelerometer, and/or other device capable of measuring an orientation of platform 110 (e.g., magnitude and direction of roll, pitch, and/or yaw, relative to one or more reference orientations such as gravity and/or Magnetic North), gimbal system 122, imaging system/sensor payload 140, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of platform 110 and/or other elements of system 100 and providing such measurements as sensor signals and/or data that may be communicated to other devices of system 100 (e.g., user interface 132, controller 112).

GNSS 118 may be implemented according to any global navigation satellite system, including a GPS, GLONASS, and/or Galileo based receiver and/or other device capable of determining absolute and/or relative position of platform 110 (e.g., or an element of platform 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Communication module 120 may be implemented as any wired and/or wireless communication module configured to transmit and receive analog and/or digital signals between elements of system 100. For example, communication module 120 may be configured to receive flight control signals and/or data from base station 130 and provide them to controller 112 and/or propulsion system 124. In other embodiments, communication module 120 may be configured to receive images and/or other sensor information (e.g., visible spectrum, infrared, and/or ultraviolet still images or video images) from sensor payload 140 and relay the sensor data to controller 112 and/or base station 130. In further embodiments, communication module 120 may be configured to receive sensor data and/or other sensor information from ranging sensor system 128 and relay the sensor data to controller 112 and/or base station 130. In some embodiments, communication module 120 may be configured to support spread spectrum transmissions, for example, and/or multiple simultaneous communications channels between elements of system 100. Wireless communication links may include one or more analog and/or digital radio communication links, such as WiFi and others, as described herein, and may be direct communication links established between elements of system 100, for example, or may be relayed through one or more wireless relay stations configured to receive and retransmit wireless communications.

In some embodiments, communication module 120 may be configured to monitor the status of a communication link established between platform 110, sensor payload 140, and/or base station 130. Such status information may be provided to controller 112, for example, or transmitted to other elements of system 100 for monitoring, storage, or further processing, as described herein. Communication links established by communication module 120 may be configured to transmit data between elements of system 100 substantially continuously throughout operation of system 100, where such data includes various types of sensor data, control parameters, and/or other data, as described herein.

In some embodiments, gimbal system 122 may be implemented as an actuated gimbal mount, for example, that may be controlled by controller 112 to stabilize sensor payload 140 relative to a target or to aim sensor payload 140 according to a desired absolute or relative direction and/or position. As such, gimbal system 122 may be configured to provide a relative orientation of sensor payload 140 (e.g., relative to an orientation of platform 110) to controller 112 and/or communication module 120 (e.g., gimbal system 122 may include its own orientation sensor 114). In other embodiments, gimbal system 122 may be implemented as a gravity driven mount (e.g., non-actuated). In various embodiments, gimbal system 122 may be configured to provide power, support wired communications, and/or otherwise facilitate operation of an articulated sensor/sensor payload 140. In further embodiments, gimbal system 122 may be configured to couple to a laser pointer, range finder, and/or other device, for example, to support, stabilize, power, and/or aim multiple devices (e.g., sensor payload 140 and one or more other devices) substantially simultaneously. In alternative embodiments, imaging system/sensor payload 140 may be fixed to mobile platform 110 such that gimbal system 122 is implemented as a fixed perspective mounting system for sensor payload 140.

Propulsion system 124 may be implemented as one or more propellers, turbines, or other thrust-based propulsion systems, and/or other types of propulsion systems that can be used to provide motive force and/or lift to platform 110 and/or to steer platform 110. In some embodiments, propulsion system 124 may include multiple propellers (e.g., a tri, quad, hex, oct, or other type "copter") that can be controlled (e.g., by controller 112) to provide lift and motion for platform 110 and to provide an orientation for platform 110. In other embodiments, propulsion system 110 may be configured primarily to provide thrust while other structures of platform 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Other modules 126 may include other and/or additional sensors, actuators, communication modules/nodes, and/or user interface devices, for example, and may be used to provide additional environmental information related to operation of platform 110, for example. In some embodiments, other modules 126 may include a humidity sensor, a wind and/or water temperature sensor, a barometer, an altimeter, an analyte detection system, a radar or other ranging sensor system, a proximity sensor, a visible spectrum camera or infrared/thermal camera (with an additional mount), an irradiance detector, and/or other environmental sensors providing measurements and/or other sensor signals that can be displayed to a user and/or used by other devices of system 100 (e.g., controller 112) to provide operational control of platform 110 and/or system 100.

In some embodiments, other modules 126 may include one or more actuated and/or articulated devices (e.g., multispectrum active illuminators, visible and/or IR cameras, radars, sonars, and/or other actuated devices) coupled to platform 110, where each actuated device includes one or more actuators adapted to adjust an orientation of the device, relative to platform 110, in response to one or more control signals (e.g., provided by controller 112). In particular, other modules 126 may include a stereo vision system configured to provide image data that may be used to calculate or estimate a position of platform 110, for example, or to calculate or estimate a relative position of target in a scene or a navigational hazard in proximity to platform 110. In various embodiments, controller 130 may be configured to use such proximity and/or position information to help detect camouflaged targets, safely pilot platform 110, and/or monitor a survey area, as described herein.

In various embodiments, ranging sensor system 128 may be implemented as a laser rangefinder system, a lidar system, a radar system, a sonar system, and/or other ranging sensor system mounted to platform 110 and configured to provide ranging sensor data (e.g., laser rangefinder data, lidar data, radar data, sonar data, and/or other ranging sensor data) corresponding to a scene in view of ranging sensor system 128, imaging system 140, and/or platform 110. In some embodiments, ranging sensor system 128 may be integrated with a gimbal system similar to gimbal system 122.

User interface 132 of base station 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communication module 134 of base station 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of platform 110 and/or other elements of system 100. For example, user interface 132 may be adapted to display a time series of positions, headings, and/or orientations of platform 110 and/or other elements of system 100 overlaid on a geographical map, which may include one or more graphs indicating a corresponding time series of actuator control signals, sensor information, and/or other sensor and/or control data and/or signals.

In some embodiments, user interface 132 may be adapted to accept user input including a user-defined target destination, heading, waypoint, route, and/or orientation for an element of system 100, for example, and to generate control signals to cause platform 110 to move according to the target destination, heading, route, and/or orientation, or to aim sensor payload 140 or ranging sensor system 128 accordingly. In other embodiments, user interface 132 may be adapted to accept user input modifying a control loop parameter of controller 112, for example.

In further embodiments, user interface 132 may be adapted to accept user input including a user-defined target attitude, orientation, and/or position for an actuated or articulated device (e.g., sensor payload 140 or ranging sensor system 128) associated with platform 110, for example, and to generate control signals for adjusting an orientation and/or position of the actuated device according to the target attitude, orientation, and/or position. Such control signals may be transmitted to controller 112 (e.g., using communication modules 134 and 120), which may then control platform 110 accordingly.

Communication module 134 may be implemented as any wired and/or wireless communication module configured to transmit and receive analog and/or digital signals between elements of system 100. For example, communication module 134 may be configured to transmit flight control signals from user interface 132 to communication module 120 or 144. In other embodiments, communication module 134 may be configured to receive sensor data (e.g., visible spectrum, infrared, and/or ultraviolet still images or video images, or other sensor data) from sensor payload 140 and/or ranging sensor system 128. In some embodiments, communication module 134 may be configured to support spread spectrum transmissions, for example, and/or multiple simultaneous communications channels between elements of system 100. In various embodiments, communication module 134 may be configured to monitor the status of a communication link established between base station 130, sensor payload 140, and/or platform 110 (e.g., including packet loss of transmitted and received data between elements of system 100, such as with digital communication links), as described herein. Such status information may be provided to user interface 132, for example, or transmitted to other elements of system 100 for monitoring, storage, or further processing, as described herein.

Other modules 136 of base station 130 may include other and/or additional sensors, actuators, communication modules/nodes, and/or user interface devices used to provide additional environmental information associated with base station 130, for example. In some embodiments, other modules 136 may include a humidity sensor, a wind and/or water temperature sensor, a barometer, a radar system, a visible spectrum camera, an infrared or thermal camera, a GNSS, and/or other environmental sensors providing measurements and/or other sensor signals that can be displayed to a user and/or used by other devices of system 100 (e.g., controller 112) to provide operational control of platform 110 and/or system 100 or to process sensor data to compensate for environmental conditions, such as an water content in the atmosphere approximately at the same altitude and/or within the same area as platform 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by user interface 132).

In embodiments where imaging system/sensor payload 140 is implemented as an imaging device, imaging system/sensor payload 140 may include imaging module 142, which may be implemented as a cooled and/or uncooled array of detector elements, such as visible spectrum, infrared, and/or ultraviolet sensitive detector elements, including quantum well infrared photodetector elements, bolometer or microbolometer based detector elements, type II superlattice based detector elements, and/or other infrared spectrum detector elements that can be arranged in a focal plane array (FPA) (e.g., along with other detector elements sensitive to other spectrums). In various embodiments, imaging module 142 may be implemented with a complementary metal oxide semiconductor (CMOS) based FPA of detector elements that are sensitive to portions of the visible, near-infrared (NIR), and long wave ultraviolet (LWUV) spectrums simultaneously. In various embodiments, imaging module 142 may include one or more logic devices (e.g., similar to controller 112) that can be configured to process imagery captured by detector elements of imaging module 142 before providing the imagery to memory 146 or communication module 144. More generally, imaging module 142 may be configured to perform any of the operations or methods described herein, at least in part, or in combination with controller 112 and/or user interface 132.

In some embodiments, sensor payload 140 may be implemented with a second or additional imaging modules similar to imaging module 142, for example, that may include detector elements configured to detect other electromagnetic spectrums, such as visible light, thermal, ultraviolet, and/or other electromagnetic spectrums or subsets of such spectrums. In various embodiments, such additional imaging modules may be calibrated or registered to imaging module 142 such that images captured by each imaging module occupy a known and at least partially overlapping field of view of the other imaging modules, thereby allowing different spectrum images to be geometrically registered to each other (e.g., by scaling, rotating, translating, positioning, and/or otherwise transforming). In some embodiments, different spectrum images may be registered to each other using pattern recognition processing in addition or as an alternative to reliance on a known overlapping field of view.

Communication module 144 of sensor payload 140 may be implemented as any wired and/or wireless communication module configured to transmit and receive analog and/or digital signals between elements of system 100. For example, communication module 144 may be configured to transmit images from imaging module 142 to communication module 120 or 134. In other embodiments, communication module 144 may be configured to receive control signals (e.g., control signals directing capture, focus, selective filtering, and/or other operation of sensor payload 140) from controller 112 and/or user interface 132. In some embodiments, communication module 144 may be configured to support spread spectrum transmissions, for example, and/or multiple simultaneous communications channels between elements of system 100. In various embodiments, communication module 144 may be configured to monitor the status of a communication link established between sensor payload 140, base station 130, and/or platform 110 (e.g., including packet loss of transmitted and received data between elements of system 100, such as with digital communication links), as described herein. Such status information may be provided to imaging module 142, for example, or transmitted to other elements of system 100 for monitoring, storage, or further processing, as described herein.

Memory 146 may be implemented as one or more machine readable mediums and/or logic devices configured to store software instructions, sensor signals, control signals, operational parameters, calibration parameters, infrared images, and/or other data facilitating operation of system 100, for example, and provide it to various elements of system 100. Memory 146 may also be implemented, at least in part, as removable memory, such as a secure digital memory card for example including an interface for such memory.

Orientation sensor 148 of sensor payload 140 may be implemented similar to orientation sensor 114 or gyroscope/accelerometer 116, and/or any other device capable of measuring an orientation of sensor payload 140, imaging module 142, and/or other elements of sensor payload 140 (e.g., magnitude and direction of roll, pitch, and/or yaw, relative to one or more reference orientations such as gravity and/or Magnetic North) and providing such measurements as sensor signals that may be communicated to various devices of system 100. Gyroscope/accelerometer (e.g., angular motion sensor) 150 of sensor payload 140 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of sensor payload 140 and/or various elements of sensor payload 140 and providing such measurements as sensor signals that may be communicated to various devices of system 100. GNSS 149 may be implemented similar to GNSS 118 and/or any other device capable of measuring a position of sensor payload 140, imaging module 142, and/or other elements of sensor payload 140 and providing such measurements as sensor signals that may be communicated to various devices of system 100.

Other modules 152 of sensor payload 140 may include other and/or additional sensors, actuators, communication modules/nodes, cooled or uncooled optical filters, and/or user interface devices used to provide additional environmental information associated with sensor payload 140, for example. In some embodiments, other modules 152 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by imaging module 142 or other devices of system 100 (e.g., controller 112) to provide operational control of platform 110 and/or system 100 or to process imagery to compensate for environmental conditions.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for platform 110, using one or more power leads. Such power leads may also be used to support one or more communication techniques between elements of system 100.

Figure 2:
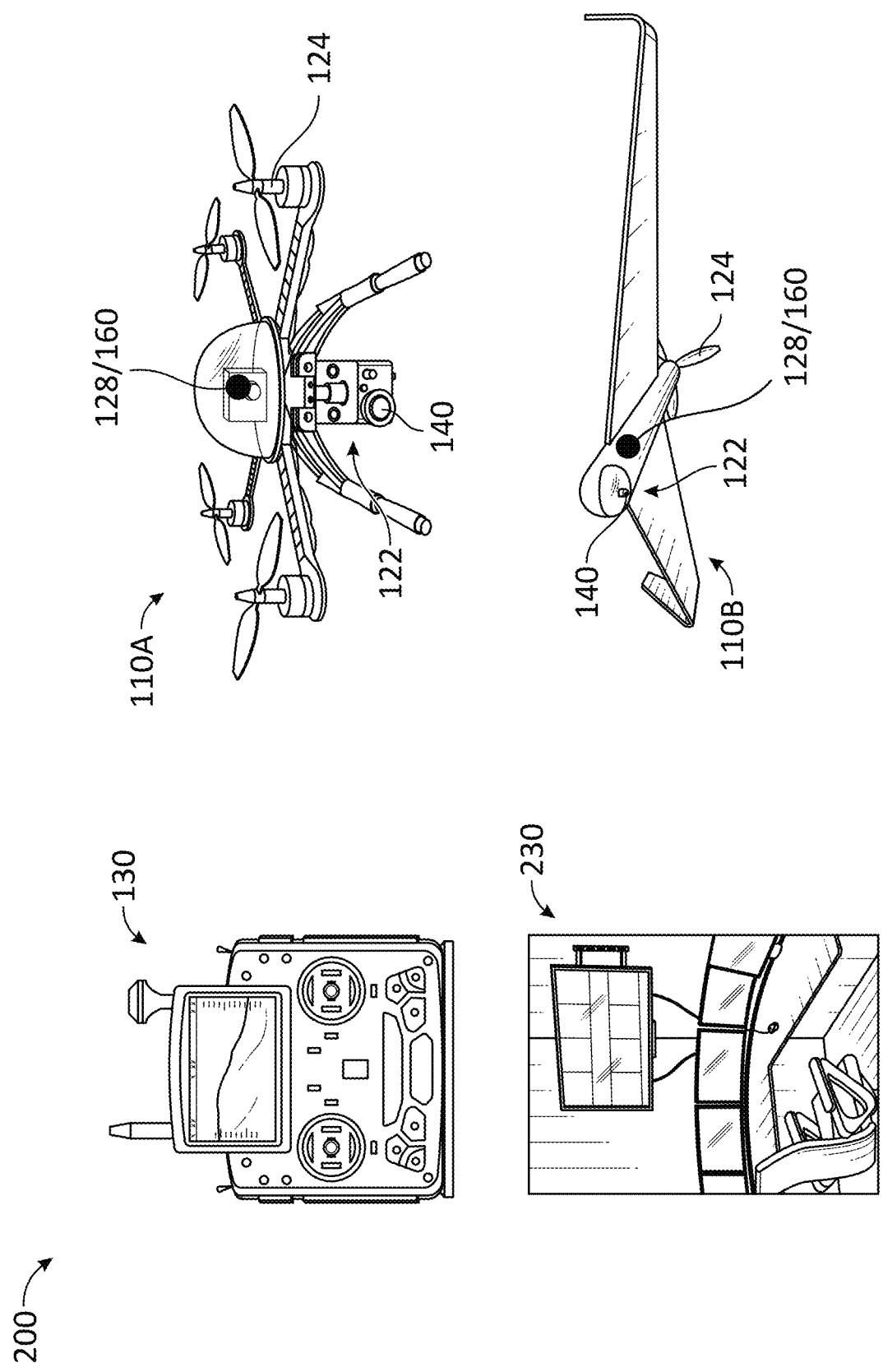
FIG. 2 illustrates a diagram of mobile platforms implementing a camouflage detection system in accordance with an embodiment of the disclosure.

FIG. 2 illustrates a diagram of mobile platforms 110A and 110B implementing a camouflage detection system 200 including embodiments of imaging system 140 and/or ranging sensor system 128 in accordance with an embodiment of the disclosure. In the embodiment shown in FIG. 2, camouflage detection system 200 includes base station 130, optional co-pilot station 230, mobile platform 110A with articulated imaging system/sensor payload 140, gimbal system 122, and ranging sensor system 128, and mobile platform 110B with articulated imaging system/sensor payload 140, gimbal system 122, and ranging sensor system 128, where base station 130 and/or optional co-pilot station 230 may be configured to control motion, position, orientation, and/or general operation of platform 110A, platform 110B, sensor payloads 140, and/or ranging sensor systems 128.

In various embodiments, co-pilot station 230 may be implemented similarly relative to base station 130, such as including similar elements and/or being capable of similar functionality. In some embodiments, co-pilot station 230 may include a number of displays so as to facilitate operation of various imaging and/or sensor payloads of mobile platforms 110A-B, generally separate from piloting mobile platforms 110A-B, and to facilitate substantially real time analysis, visualization, and communication of sensor data and corresponding directives, such as to first responders in contact with a co-pilot or user of system 200. For example, base station 130 and co-pilot station 230 may each be configured to render any of the display views described herein.

As described herein, embodiments of camouflage detection system 100 may be implemented with a relatively compact, low weight, and low power imaging system (e.g., imaging system 140) that can be used to help detect camouflaged targets, as described herein, and/or operate a mobile platform, such as through assisted navigation, where processed imagery and/or display views are provided to an operator to help the operator pilot the mobile platform, or through autopilot navigation, where such imagery is used to autopilot the mobile platform according to a desired route, destination, or other operational parameters.

Figure 3:
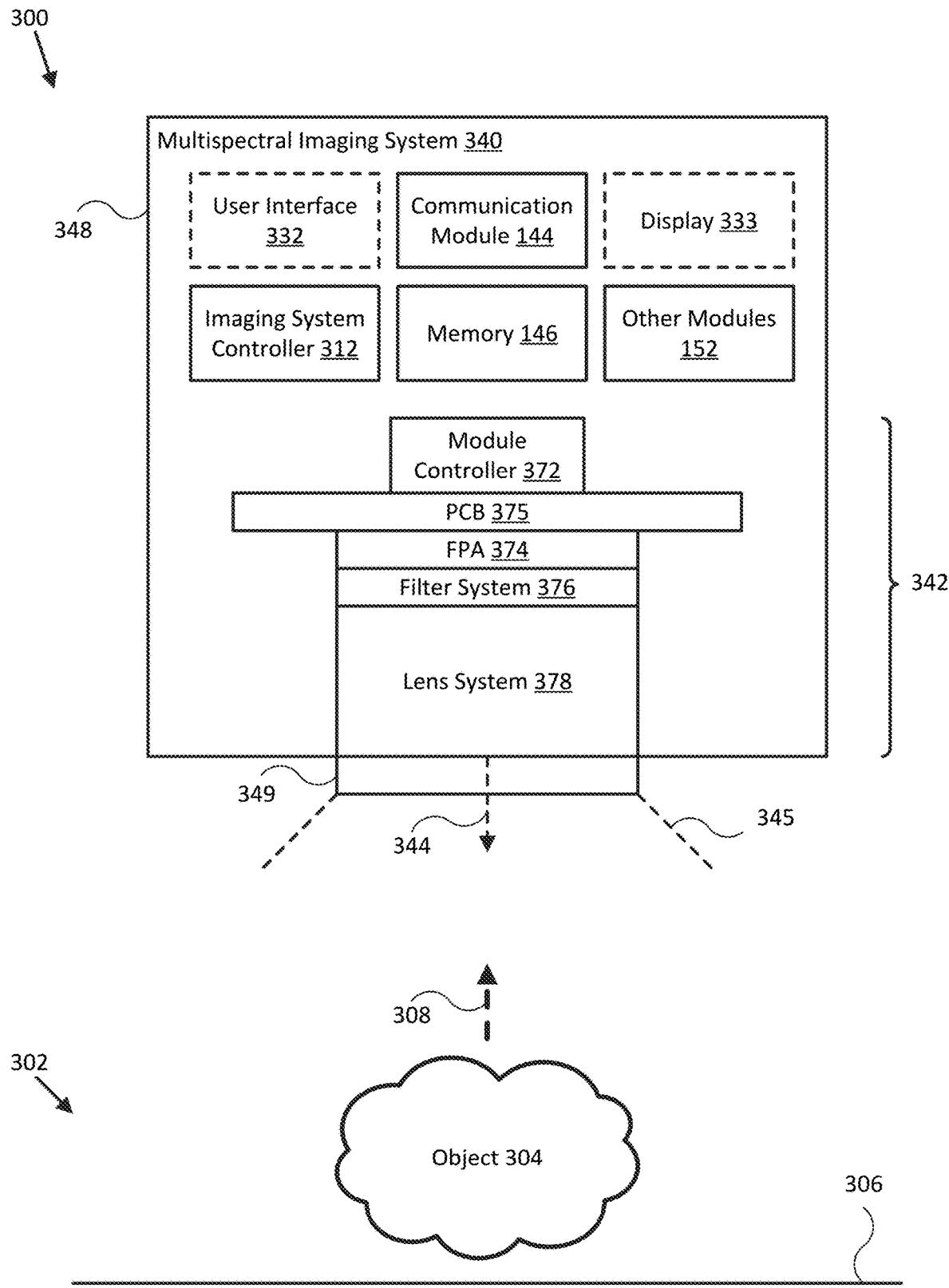
FIG. 3 illustrates a diagram of a multispectral imaging system for a camouflage detection system in accordance with an embodiment of the disclosure.

In some embodiments, imaging system 140 may be implemented as a multispectral imaging system including a multispectral imaging module implemented by a CMOS based FPA formed, fabricated, assembled, and/or otherwise configured to have sensitivity in the IR, VIS, and UV spectrums/bands. For example, FIG. 3 illustrates a diagram of a multispectral imaging system 340 including multispectral imaging module 342 for camouflage detection system 100, 200, and/or 300 in accordance with an embodiment of the disclosure.

Such multispectral imaging module may include a Bayer filter configured to generate a mosaic or pattern of IR, VIS, and UV pixels in the FPA such that each image captured by the multispectral imaging module includes IR, VIS, and UV information about each scene imaged by the multispectral imaging module. In particular embodiments, such FPA may be sensitive to portions of the NIR, VIS, and LWUV spectrums, including at least 400-750 nm (VIS), 750-1100 nm (NIR), and 330-400 nm (LWUV), and the Bayer filter may be configured to selectively pass such bands according to a particular mosaic or pattern.

In some embodiments, such Bayer filter may be deposited directly onto the FPA, for example, and/or may form a checkerboard-like mosaic similar to mosaics used for RGB VIS imaging. Any one of the VIS, NIR, or LWUV spectrums may be emphasized or deemphasized relative to the other two spectrums in resulting imagery according to a particular mosaic selected for the Bayer filter and/or according to a particular demosaicing algorithm (e.g., based on one or more of interpolation, spectral correlation, spatial correlation, and/or other demosaicing technique).

In some embodiments, a particular demosaicing algorithm may be selected based on one or more environmental conditions associated with an imaged scene or object, for example, or associated with an operational state, position, or orientation of mobile platform 110 and/or imaging module 342 of multispectral imaging system 340. For example, a particular demosaicing algorithm may be configured to deemphasize horizon-aligned polarized VIS, NIR, and/or LWUV contributions to a captured image based on a time of day (e.g., a position of the sun in the sky), a position of mobile platform 110, and/or an orientation of mobile platform 110 and/or multispectral imaging system 340, so as to reduce image artifacts (e.g., pixel saturation artifacts) caused by relatively strong reflections of ambient light from horizon-aligned surfaces. In another example, a particular demosaicing algorithm may be configured to emphasize UV contributions to a captured image based on a time of day (e.g., a level of natural ambient light provided by the sun) a position of mobile platform 110 (e.g., geographical position and altitude to place mobile platform 110 within a topographical map of the horizon), and/or an orientation of mobile platform 110 and/or multispectral imaging system 340, when the UV contribution is expected to relatively low (e.g., while the sun is below the horizon).

Such Bayer filter may be implemented as a mosaic of single band pass filters (e.g., each pixel receiving only one of the passed IR, VIS, UV bands), for example, or may be implemented as a mosaic of notched broadband transmission filters (e.g., each pixel receiving all but one of the notched/filtered IR, VIS, UV bands). In embodiments where the Bayer filter is implemented as a mosaic of notched broadband transmission filters, the selected principal bands may be synthesized from linear combinations of two or more pixels receiving differentiated spectrums (e.g., associated with spectrally differentiated notched broadband transmission filters). In various embodiments, such synthesis may be implemented within/included as part of a demosaicing algorithm, as described herein. Such techniques can provide increased signal to noise characteristics relative to filter implemented by mosaics of single band pass filters.

In various embodiments, multispectral imaging system 340 may be capable of operating at reasonably high frame rates so that resulting image streams are contemporaneous enough to be useful for navigation of a mobile platform (e.g., where an operator or autopilot often needs to make time-critical maneuvering decisions). For example, embodiments are able to operate (e.g., capture and process imagery) at frame rates approaching approximately 100 frames/second or higher.

In particular embodiments, multispectral imaging system 340 is capable of cycling an integration time associated with an FPA of multispectral imaging module 342 over two or more preset values so that multispectral imaging system 340 can produce high dynamic range (HDR) imagery in all imaged bands. Such HDR mode may be used to provide midwell exposure values over a variety of lighting conditions, for example, and in some embodiments, the integration times may be determined and/or adjusted by multispectral imaging system 340 based on ambient light level (e.g., in one or more spectrums), contrast levels in prior captured multispectral images, and/or other environmental sensor data and/or derived or processed sensor data and/or imagery. This can be particularly important where, for example, the solar spectrum has very different scene brightnesses in IR, VIS, and UV, and the scene spectrum varies with the diurnal cycle.

A midwell exposure value refers to an exposure event where the integration capacitor for a sensor element in a CMOS based embodiment of an FPA of multispectral imaging module 342 (e.g., FPA 374 of multispectral imaging system 340 of FIG. 3) is allowed to charge to approximately half its capacity before being read out (e.g., discharged) by module controller 372 across PCB 375 (e.g., both of multispectral imaging module 342. For example, the readout frequency and/or the exposure time (e.g., controlled by a mechanical, electromechanical, and/or electronic, such LCD, embodiment of shutter 349) may be adjusted based, at least in part, on the average scene radiance (e.g., of a specific band or across multiple bands, as selected by filter system 376), so that a majority of the sensor elements of FPA 374 associated with one or more bands captured by FPA 374 are operating roughly at their midwell exposure values. Operating at such midwell exposure values results in image data captured within the most linear portion of the dynamic range of FPA 374 (e.g., providing a substantially linear response to photons being intercepted by sensor elements of FPA 374), which helps avoid image noise associated with, for example, low well charge levels. By cycling through different exposure times (e.g., integration times), embodiments are able to achieve midwell operating performance for each of the bands captured by multispectral imaging system 340.

For example, VIS radiance in a scene will often be higher than the NIR or LWUV radiance in the scene. An exposure/integration time of 5 milliseconds might provide midwell exposure levels for NIR and LWUV sensor elements (e.g., as selected by filter system 376) but overexpose VIS sensor elements of FPA 374. Multispectral imaging system 340 may be configured to capture a first image according to the first 5 millisecond exposure time, then capture a second image according to a second shorter exposure time, and then combine the NIR and LWUV components of the first image with the VIS component of the second image to generate an HDR image (e.g., as long the first and second images are captured one after the other and/or while multispectral imaging system 340 or at least FOV 345 is substantially stationary with respect to scene 302).

In various embodiments, multispectral imaging system 340 may be equipped with a lens system that is achromatic across the spectral bands captured by multispectral imaging module 342. Such lens system may be implemented with a focal length chosen to provide a relatively wide field of view (FOV) that is sufficient with respect to navigation system and UAS imaging FOV requirements (e.g., mission, specification, and/or regulatory requirements).

In some embodiments, multispectral imaging system 340 may be configured to process captured imagery according to multispectral image analytics and/or algorithms (e.g., on-board or after transmission to other processing elements of system 100) configured to classify scene pixels according to their likelihood of being part of a particular class of object or target. For example, clear sky has a distinctive spectrum to it, being darker in the NIR and brighter in the UV. Vehicles tend to have the opposite spectrum: bright in the NIR band and dark in the UV band. Both scene elements can therefore be reliably classified based, at least in part, on their spectral characteristics. In various embodiments, such multispectral image analytics and/or algorithms may be performed by a convolutional neural network (CNN) implemented within multispectral imaging system 340, for example, or within one or more controllers associated with camouflage detection system 100.

In particular embodiments, image data provided by multispectral imaging system 340 and/or multispectral imaging module 342 may be encoded using two bytes per pixel, where 12 bits encode image data (e.g., intensity) and the remaining four bits encode information about a classification probability associated with the pixel, such as a 95% probability the pixel is sky or not sky. Such data may then be used by camouflage detection system 100 to make maneuvering (e.g., braking and steering) decisions substantially in real time (e.g., at 100+ frames/second instances in time).

In the embodiment shown in FIG. 3, multispectral imaging system 340 includes multispectral imaging module 342 including multispectral FPA 374 receiving light 308 from scene 302 through filter system 376, lens system 378, and/or optional shutter 349 along optical axis 344 and according to FOV 345. In various embodiments, multispectral imaging module 342 may include a printed circuit board (PCB) 375 or similar structure configured to support FPA 374 and couple FPA 374 and/or other elements of multispectral imaging module 342 to module controller 372 of multispectral imaging module 342. As described herein, filter system 376 may in some embodiments be implemented as a Bayer filter with a selected mosaic configured to provide differentiated spectrums (e.g., portions of VIS, IR, and UV spectrums) to pixels of FPA 374. As is also described herein, lens system 378 may be achromatic with respect to the differentiated spectrums provided to pixels of FPA 374, for example, and be configured to provide FOV 345. In some embodiments, lens system 378 may be actuated so as to adjust FOV 345, a zoom level of multispectral imaging system 340, and/or a focus of light conveyed to FPA 374. In other embodiments, lens system 378 may be a fixed lens system.

Module controller 372 may be implemented as any appropriate processing device (e.g., microcontroller, processor, application specific integrated circuit (ASIC), field programmable gate array (FPGA), or other logic device) that may be used by multispectral imaging module 342 and/or multispectral imaging system 340 to execute appropriate instructions, such as software instructions and/or signal processing operations for, for example, capturing multispectral images of scene 302 using FPA 374, filter system 376, lens system 378, and/or shutter 349, demosaicing raw pixel data associated with such multispectral images, and/or classifying pixels in such images associated with object/target 304 and/or background 306 within scene 302 (e.g., using a CNN implemented within module controller 372). Further, module controller 372 may be implemented with various signal processing devices, such as analog to digital converters (ADCs), trigger inputs, timing circuitry, and other signal or sensor processing devices as described herein.

In various embodiments, FPA 374 may be implemented by a two-dimensional planar array of similarly fabricated/sized pixel structures each configured to be sensitive across the full spectral band of multispectral imaging module 342. In other embodiments, FPA 374 may be implemented by an array of structurally differentiated pixel structure subarrays, where each subarray is sensitive to a differentiated subset of the full spectral band of multispectral imaging module 342, for example, and/or may be non-planar (e.g., concave with respect to optical axis 344), three dimensional (e.g., multi-layered), and/or may include size differentiated pixels (e.g., with larger surface areas as the distance to optical axis 344 increases).

Filter system 376 may be implemented as a static Bayer filter structure deposited or otherwise attached to an active surface of FPS 374, for example, or may be implemented as an adjustable or controllable Bayer filter structure or other type of filter structure configured to provide pixel- or FPA-portion-differentiated spectral illumination of FPA 374. In a specific example, such Bayer filter may be implemented with two VIS pixels for each NIR and LWUV pixel (e.g., similar to some Bayer filter patterns for color VIS cameras with green—2 pixels—and red and blue—1 pixel each). Such filters may be implemented as multilayer dielectric interference-type bandpass filters. More generally, filter system 376 may be configured to provide spatially and spectrally differentiated illumination of FPA 374 according to two or more, or three or more different spectrums, each of which may be full differentiated or may partially overlap an adjacent differentiated spectrum. In one embodiment, the characteristics of filter system 376 may include a NIR band of 780-1000 nm, a LWUV band of 370 nm with 60 nm full width half maximum (FWHM), and a typical VIS band.

In other embodiments, filter system 376 may be implemented at least partially by a multivariate optical element filter array (e.g., a multivariate filter or filter array). Such special interference filters are typically configured according to relatively complex engineered transmission curves that are designed to perform optical computing operations, such as operations that are analogous to a dot product between a scaled regression vector and the spectroscopic response of the scene. For example, a regression vector is commonly a consequence of the design of the filter and may be optimized for specific spectra of interest. In one embodiments, there such filter may include array with 3 or perhaps more distinct multivariate optical elements (MOEs) in a selected pattern. An MOE array designed to specifically detect scene spectra like vegetation, clear sky, overcast sky, road surfaces and vehicles may offer advantages over a simple 3-band approach. Such MOE filters can be constructed of relatively few layers than conventional bandpass filters, so they are often physically thinner than bandpass filters, which makes them an attractive choice for a filter array where the pixels of the FPA may have dimensions that are comparable to filter layer stack thicknesses. Such MOE filters may also tend to have better overall scene flux throughput (e.g., when they are composed of fewer layers than a comparable bandpass filter array).

Lens system 378 may be implemented with one or more lenses each configured to pass light to substantially all pixels of FPA 374, for example, or may be implemented with an array of lenses (e.g., a microlens array) each configured to pass light to a subset of pixels of FPA 374. In general, in embodiments where FPA is sensitive to the NIR, VIS, and LWUV bands, as described herein, each lens of lens system 378 may be configured to be color corrected or achromatic from 330-1100 nm. In some embodiments, FOV 345 may be asymmetrical (e.g., to match a corresponding FPA dimension) and be approximately 42 by 34 degrees.

While the embodiment depicted by FIG. 3 shows a relatively compact multispectral imaging system 340 implemented with a single multispectral imaging module 342 capable of providing single perspective multispectral imagery of scene 302, in other embodiments, multispectral imaging system 340 may be implemented with multiple imaging modules 142/342 each sensitive to individually differentiated spectrums, for example, and/or each providing different perspectives of scene 302, such as according to different optical axes and/or different FOVs).

PCB 375 may be a conventional printed circuit board, for example, and be adapted to provide electrical access to FPA 374 and/or other elements of multispectral imaging module 342 (e.g., through various metal traces) as well as physical support for FPA 374 and/or other elements of multispectral imaging module 342. In some embodiments, shutter 349 may be implemented as a mechanical or removable light shield adapted to selectively block one or more bands of light 308. In various embodiments, shutter 349 may be actuated (e.g., opened and/or closed) electronically by module controller 372 and/or imaging system controller 312, for example. Shutter 349 may be coupled to/supported by housing 348, for example, and housing 348 may be adapted to protect system 300 from environmental conditions associated with space or atmospheric flight, and/or other outdoor environmental conditions, such as fixed or articulated mounting on a terrestrial vehicle, for example. In other embodiments, housing 348 may be adapted for handheld use.

As shown in FIG. 3, multispectral imaging system 340 may be implemented with a variety of other components adapted to facilitate operation of multispectral imaging system 340, including capturing multispectral images of scene 302, demosaicing images of scene 302, detecting characteristics of (e.g., presence, extents, range, translucency, visible color, and/or other characteristics) and/or classifying object/target 304 and background 306 of scene 302 (e.g., as sky or not sky, maneuvering obstruction or not maneuvering obstruction, mobile target or not mobile target, vegetation or not vegetation, road/earth or not road/earth, water surface or not water surface, and/or likelihood thereof), and/or reporting such sensor data to other elements of system 100 as described herein. In some embodiments, system 300 may report sensor data by aggregating sensor data over time (e.g., multiple frames) to provide a time-duration-based reliability of such characteristics and/or classifications determined by system 300, and then transmitting the sensor data to other elements of system 100. In other embodiments, system 300 may report sensor data by energizing an LED indicator and/or transmitting an alert or notification signal to a component (e.g., an alarm, or an electrical switch or relay) of systems 300 or 100.

Each of imaging sensor controller 312, memory 146, user interface 332, communication module 144, display 333, and other modules 152, if optionally included in multispectral imaging system 340, may be coupled to PCB 375 or to housing 348, for example, depending on a desired application and/or overall size of multispectral imaging system 340 and/or multispectral imaging module 342. In other embodiments, any one or group of such components may be implemented externally to multispectral imaging system 340, for example, and/or in a distributed or grouped manner (e.g., multiple imaging system controllers 312 operating multispectral imaging system 340, or multiple multispectral imaging systems 340 operated by a single imaging system controller 312).

Imaging system controller 312 may be implemented as any appropriate processing device (e.g., microcontroller, processor, application specific integrated circuit (ASIC), field programmable gate array (FPGA), or other logic device) that may be used by system 300 to execute appropriate instructions, such as software instructions and/or signal processing operations for, for example, capturing multispectral images of scene 302 using multispectral imaging module 342, demosaicing raw pixel data associated with such multispectral images, classifying pixels and/or elements of scene 302 in such images (e.g., using a CNN implemented within imaging system controller 312), and/or reporting such sensor data/information to other elements of camouflage detection system 100 or 300. Further, imaging system controller 312 may be implemented with various signal processing devices, such as analog to digital converters (ADCs), trigger inputs, timing circuitry, and other signal or sensor processing devices as described herein.

In various embodiments, at least some portion or some functionality of imaging system controller 312 may be part of or implemented with other existing controllers or logic devices of separate systems, such as a server, a personal electronic device (e.g., a mobile phone, smartphone, tablet device, laptop computer, desktop computer), and/or any other device that may be used to process, report, or act on multispectral images captured by system 300. In other embodiments, imaging system controller 312 may be adapted to interface and communicate with various external controllers or logic devices and associated components and/or perform various operations in a distributed manner.

In general, imaging system controller 312 may be adapted to interface and communicate with other components of system 300 to perform the methods and processes described herein. In one embodiment, imaging system controller 312 may be adapted to use communication module 144 to report multispectral imagery and/or pixel/object classifications to display 333 and render and/or display a such information or an alert notification, for example, or render and/or display an image of a classification map corresponding to scene 302. In another embodiment, imaging system controller 312 may be adapted to use communication module 144 to establish a wired or wireless communication link with a remote reporting system, for example, and report such sensor information.

Memory 146 is typically in communication with at least imaging system controller 312 and may include one or more memory devices (e.g., memory components) to store information, including image data, calibration data, other types of sensor data, and/or software instructions. Such memory devices may include various types of volatile and non-volatile information storage devices, such as RAM (Random Access Memory), ROM (Read-Only Memory), EEPROM (Electrically-Erasable Read-Only Memory), flash memory, a disk drive, and/or other types of memory. In one embodiment, memory 146 may include a portable memory device that can be removed from system 300 and used to convey stored data to other systems for further processing and inspection.

Communication module 144 may be configured to facilitate communication and interfacing between various components of system 300 (e.g., between imaging system controller 312 and memory 146 and/or display 333) and/or various external devices, such as a wireless access point, a personal electronic device, a server, and/or other detectors. For example, components such as user interface 332 and display 333 may transmit and receive data to and from imaging system controller 312 through communication module 144, which may be adapted to manage wired and/or wireless communication links between the various components. As such, communication module 144 may support various interfaces, protocols, and standards for local system networking, such as the controller area network (CAN) bus, the local interconnect network (LIN) bus, the media oriented systems transport (MOST) network, or the ISO 11738 (or ISO bus) standard.

In some embodiments, imaging system controller 312 may be adapted to communicate, via communication module 144, with a remote user interface, a notification system, or other detection systems to, for example, aggregate reports from multiple systems or sensors and/or implement a particular detection and/or notification method. As such, communication module 144 may include a wireless communication component (e.g., based on the IEEE 802.11 WiFi standards, the Bluetooth™ standard, the ZigBee™ standard, or other appropriate short range wireless communication standards), a wireless broadband component (e.g., based on WiMax technologies), a mobile cellular component, a wireless satellite component, or other appropriate wireless communication components. Communication module 144 may also be configured to interface with a wired network and/or device via a wired communication component, such as an Ethernet interface.

If present, user interface 332 provides for user interaction with multispectral imaging system 340 and may include one or more buttons, indicators (e.g., LEDs), keyboards, trackballs, knobs, joysticks, displays (e.g., a liquid crystal display, a touch-screen display), and/or other type of user interface adapted to accept user input and/or provide user feedback. In one embodiment, user interface 332 may include a power button, a vibration motor, an LED to indicate a maneuvering obstruction, and/or a speaker to provide an audible indication of a maneuvering obstruction (e.g., visible, tactile, and/or audible indicators). In various embodiments, user interface 332 may be used to input a variety of system configuration settings, such as integration time parameters, demosaicing algorithm selections, and/or other configuration settings, as described herein. In some embodiments, user interface 332 may be used to view one or more reports, graphs, and/or other image data captured by system 300 and/or processed according to the various operations described herein.

If present, display 333 may be configured to present, indicate, or otherwise convey alerts, notifications, and/or other reports of image data and/or object or pixel classifications (e.g., generated by imaging system controller 312). Display 333 may be implemented with an electronic display screen, such as a liquid crystal display (LCD), a cathode ray tube (CRT), or various other types of generally known video displays and monitors, including touch-sensitive displays. Display 333 may be suitable for presenting image data, graphs, video, reports, or other information as described herein.

Other modules 152 may include a temperature sensor/probe (e.g., a thermocouple, an infrared thermometer), an LED or laser diode, an ambient light sensor, a voltage regulator and/or filter, a variable voltage source, and/or other types of devices that can be used to facilitate operation of multispectral imaging system 340, as described herein. In some embodiments, other modules 152 may include a GNSS, accelerometer, compass, and/or other orientation sensor capable of sensing a position and/or orientation of multispectral imaging system 340. Other modules 152 may additionally include a power module implemented as a battery, a power adapter, a charging circuit, a power interface, a power monitor, and/or other type of power supply providing a mobile power source.

In accordance with embodiments described herein, camouflage detection systems may benefit from a variety of single, dual, and/or multispectral imaging and visualization techniques configured to improve the operational flexibility, reliability, and accuracy of such systems. In particular, embodiments may be configured to provide various display views, including augmented reality views based on imagery provided by imaging system 140 and/or multispectral imaging system 340 and/or other imagers of system 100, allowing a user to access and monitor such features and capabilities, for example, and may be implemented according to various processes and/or control loops configured to ease pilot burden, protect operation of mobile platforms of such systems, and qualitatively and quantitatively evaluate potential maneuvering obstructions, presence, extents, and velocities of camouflaged targets, and evasion options more quickly and more reliably than conventional navigation systems.

In various embodiments, system 100 may be configured to visualize and characterize a maneuvering obstruction and/or camouflaged target through use of imaging system 140, multispectral imaging system 340, and other sensors mounted to mobile platform 110. In general, mobile platform 110 can relay sensor data to an onboard operator or remote operators at base station 130 and/or co-pilot station 230 where the sensor data can be processed or used to maneuver mobile platform 110. Such sensor data may also be rendered on a display to help visualize and characterize the maneuvering obstacle or camouflaged target to assist a human operator with detecting and evading a maneuvering obstruction or camouflaged target. For example, elements of system 100 can autonomously map the extents of one or more maneuvering obstacles or camouflaged targets and overlay resulting sensor data onto a geospatial chart or imagery, such that an operator can visualize the full extent of the maneuvering obstacle(s) or camouflaged target(s) and proceed safely. In embodiments where system 100 or 300 includes a handheld mobile platform, elements of system 100 or 300 can aggregate various data to provide critical and timely warnings and/or safety directives to the user of the handheld platform.

Embodiments may overlay 2D or 3D sensor data onto geospatial maps or imagery as icons or colored highlights or blobs so that users can visualize the extent of a maneuvering obstacle or camouflaged target. Embodiments may optionally include a second screen/additional base stations so that sensor data can be viewed/processed by a user other than a UAV/UGV pilot.

In some embodiments, a display view (e.g., rendered by user interface 132 and/or display 333) may include a geospatial chart or augmented imagery surrounded by various selector/indicator groups (e.g., a header, payload controller menus, video feed, and platform telemetry indicator) configured to visualize and/or quantify maneuvering obstacles or camouflaged targets and operate mobile platform 110 and/or elements of mobile platform 110. For example, a header may include one or more selectors and/or indicators configured to receive user selection of a particular selector to enable, disable, or select active sensor payloads (e.g., imaging system 140, multispectral imaging system 340, ranging sensor system 128) for display of corresponding georeferenced sensor data within a geospatial chart or augmented imagery, for example, or to indicate an operational status of mobile platform 110 and/or various elements of mobile platform 110.

In related embodiments, a geospatial chart or augmented imagery includes a mobile platform indicator and a maneuvering obstacle or camouflaged target overlay rendered over a base map or chart. In various embodiments, system 100 may be configured to determine a shape, extent, and/or other characteristics of a maneuvering obstacle or camouflaged target overlay within the geospatial chart or augmented imagery based, at least in part, on sensor data provided by imaging system 140, multispectral imaging system 340, ranging sensor system 128, and orientation and/or position data (e.g., provided by OPS 167 and/or other orientation and/or position or motion sensors of mobile platform 110 or elements of mobile platform 110) as mobile platform 110 maneuvers within the area shown in the geospatial chart or augmented imagery. For example, system 100 may be configured to determine an extent associated with object/target 304 from the perspective of optical axis 344 based on sensor data and/or environmental conditions provided by mobile platform 110, and render the maneuvering obstruction or camouflaged target overlay according to a color mapping to indicate a type of camouflaged target or relative range or approaching velocity, such as hot colors (e.g., red) to indicate relatively close or quickly approaching maneuvering obstructions or camouflaged targets, and cold colors (e.g., blue) to indicate relatively far or quickly receding maneuvering obstructions or camouflaged targets.

In another embodiment, system 100 may be configured to determine multiple types of maneuvering obstacles or camouflaged targets are present within a particular survey area or scene, for example, and render each type of maneuvering obstacle or camouflaged target according to a different overlay layer presented in a display view, each of which may be selective enabled and/or disabled by a user.

Figure 4:
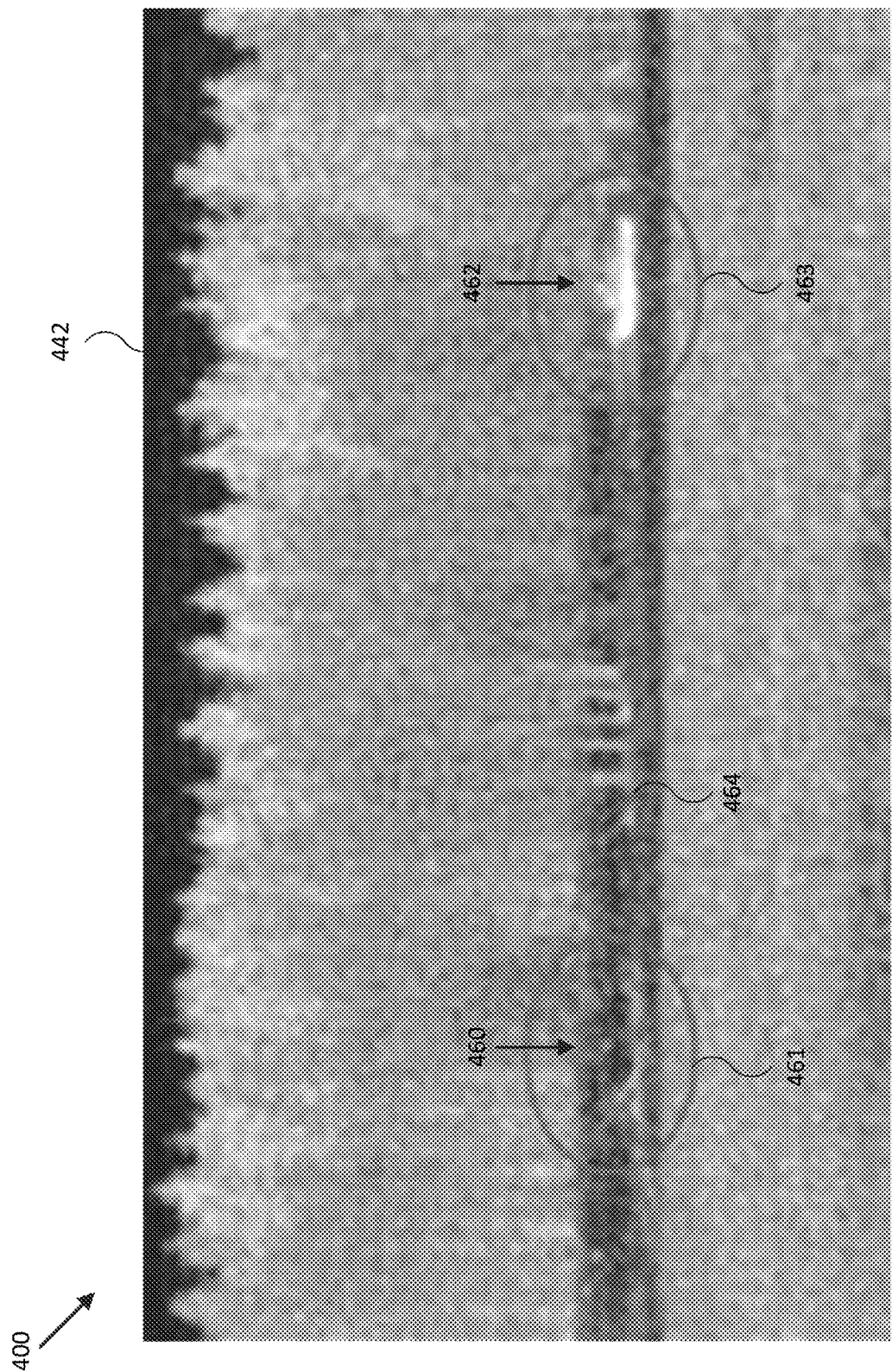
FIGS. 4-5 illustrate display views for a camouflage detection system in accordance with embodiments of the disclosure.
Figure 5:
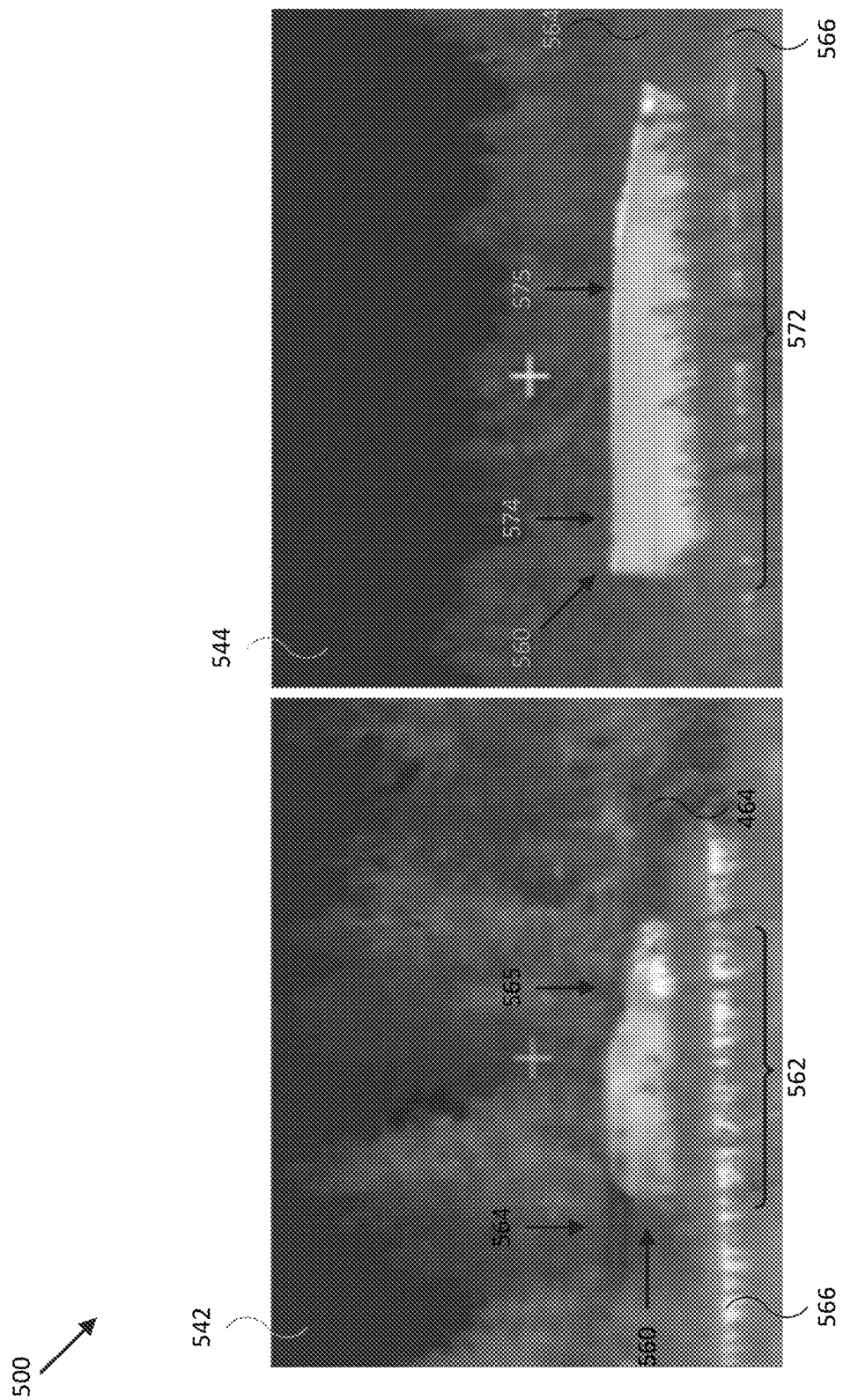

FIGS. 4-5 illustrate display views 400, 500 for camouflage detection system 100 in accordance with embodiments of the disclosure. In FIG. 4, display view 400 includes an infrared image 442 of a scene including camouflaged target 460 within target indicator 461 and non-camouflaged/visible target 462 within target indicator 463, displayed alongside spatially and texturally differentiated infrared background 464. As can be seen in FIG. 4, camouflaged target/tank 460 is employing active infrared/thermal camouflage that renders it undetectable in the infrared spectrum against background 464, whereas non-camouflaged target/tank 462 (e.g., the same type of vehicle operating under the same conditions as tank 460) is visible within infrared/thermal image 442. As such, display view 400 illustrates a circumstance where supplemental sensor data would be used to detect the presence of camouflaged target/tank 460.

In FIG. 5, display view 500 includes an infrared image 542 of a scene including camouflaged target 560, shown traveling adjacent to road 566, with first estimated target spatial profile 562 and target profile portions 564 and 565 actively camouflaged to mimic infrared background 464. First estimated target spatial profile 562 may be a spatial profile with a shape and/or extents estimated based on a spatially connected, localized, and/or substantially uniform portion of the infrared image data of infrared image 542. Display view 500 also includes supplemental image 544 including target 560, shown traveling adjacent to road 566, with second estimated target spatial profile 572 and target profile portions 574 and 575 (e.g., corresponding to target profile portions 564 and 565 of image 542) unable to mimic infrared background 564. Second estimated target spatial profile 572 may be a spatial profile with a shape and/or extents estimated based on a spatially connected, localized, and/or substantially uniform portion of the supplemental sensor data of supplemental image 544. In some embodiments, supplemental image 544 corresponds to an infrared image captured while the active camouflage of target 560 is disabled. In other embodiments, supplemental image 544 corresponds to sensor data provided by a supplemental sensor system (e.g., an imaging system/module sensitive to a different spectrum, a ranging sensor system, and/or a sensor system located in a different position than the imaging system used to provide infrared image 542). As such, display view 500 illustrates a circumstance where supplemental sensor data may be used to detect the presence of camouflaged target/tank 560.

For example, infrared image 542 and supplemental sensor data/image 544 could be directly overlaid on one another in a targeting display viewed by a human soldier, or they could be compared using machine vision processing in such a way that system 100 could be configured to highlight target profile anomalies (e.g., target profile portions 564 and 565) in a resulting targeting display view/image. The former may be very useful for tactical real time human interpretation, for example, and the latter could help reduce the workload on a user while highlighting relevant target profile anomalies the user may otherwise miss. Embodiments described herein may use a ranging sensor system, such as lidar, in combination with thermal imaging to compare sensor data of the same scene in two different spectra, as shown in FIG. 5. By overlaying the image from lidar on the thermal image, one could see that, while thermal image 542 indicates a common passenger vehicle, lidar shows a target profile and/or set of target boundaries that conform more closely to a tank than a passenger vehicle.

Figure 6A:
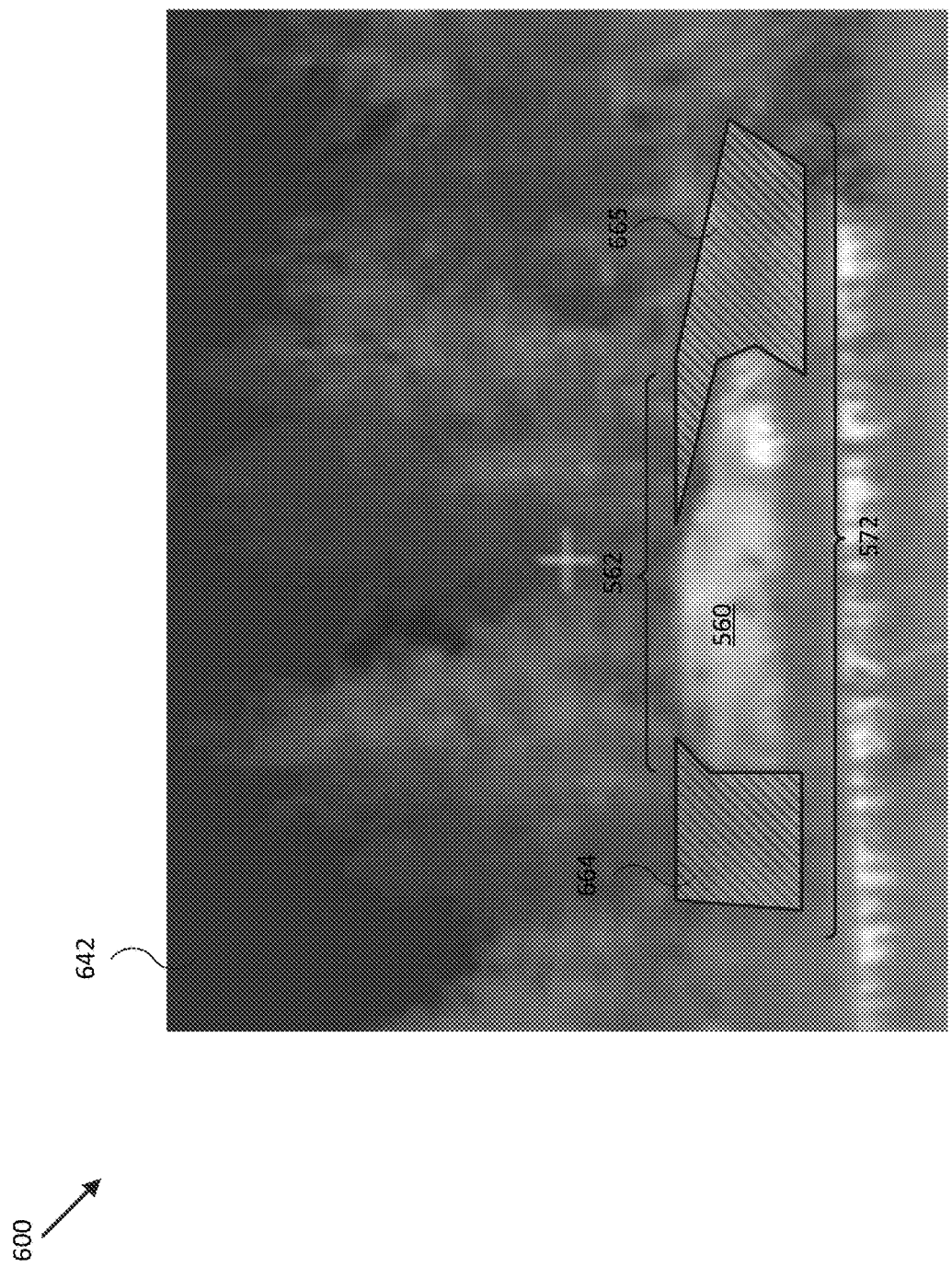
FIGS. 6A-B illustrate display views for a camouflage detection system in accordance with embodiments of the disclosure.
Figure 6B:
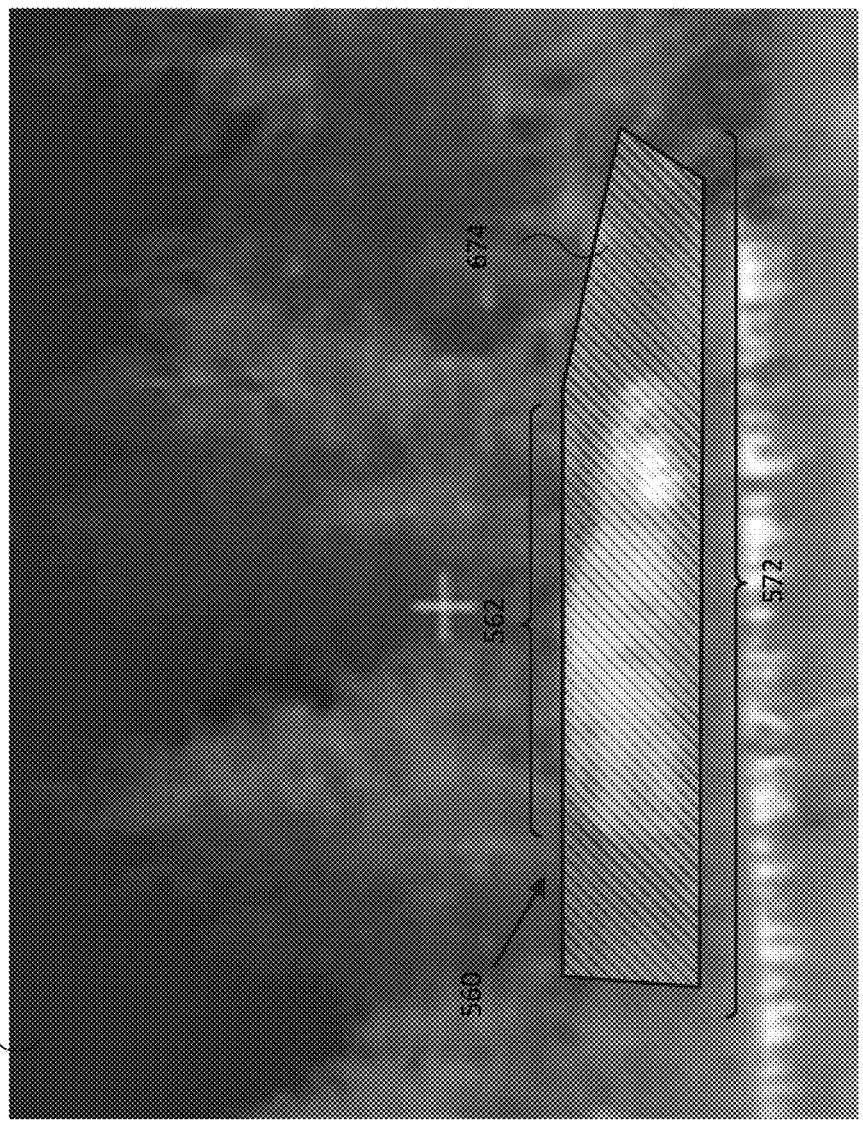

FIGS. 6A-B illustrate targeting display views 600, 602 for a camouflage detection system in accordance with embodiments of the disclosure. In FIG. 6A, targeting display view 600 includes infrared image 642 (e.g., infrared image data provided by imaging system 140) of a scene including camouflaged target 560, and display view 600 may include first estimated target spatial profile 562, second estimated target profile 572, and one or more visually differentiated portions 664 and 665 of infrared image 642 indicating one or more target profile anomalies corresponding to the differences between first estimated target spatial profile 562 and second estimated target profile 572. In various embodiments, visually differentiated portions 664 and 665 of infrared image 642/display view 600 may be highlighted portions, shaded portions, and/or otherwise visually differentiated portions of the rendering of display view 600 configured to indicate the likelihood, presence, and/or extent of active camouflage of target 560. In various embodiments, display view 600 may be based on a supplemental image derived from supplemental sensor data, as opposed to infrared/thermal image data, for example.

In FIG. 6B, targeting display view 602 includes infrared image 672 (e.g., infrared image data provided by imaging system 140) of a scene including camouflaged target 560, and display view 600 may include first estimated target spatial profile 562, second estimated target profile 572, and overlay portion 674 of infrared image 672 including supplemental sensor data corresponding roughly to second estimated target profile 572. In various embodiments, overlay portion 674 of display view 602 may include at least a portion of supplemental sensor data of the scene corresponding to camouflaged target 560 and/or one or more target profile anomalies, as described herein, and may be configured to indicate the likelihood, presence, and/or extent of active camouflage of target 560. In various embodiments, display view 602 may be based on a supplemental image derived from supplemental sensor data, as opposed to infrared/thermal image data, for example, and overlay portion 674 may include at least a portion of infrared image data of the scene (e.g., of infrared image 672) corresponding to camouflaged target 560.

Figure 7:
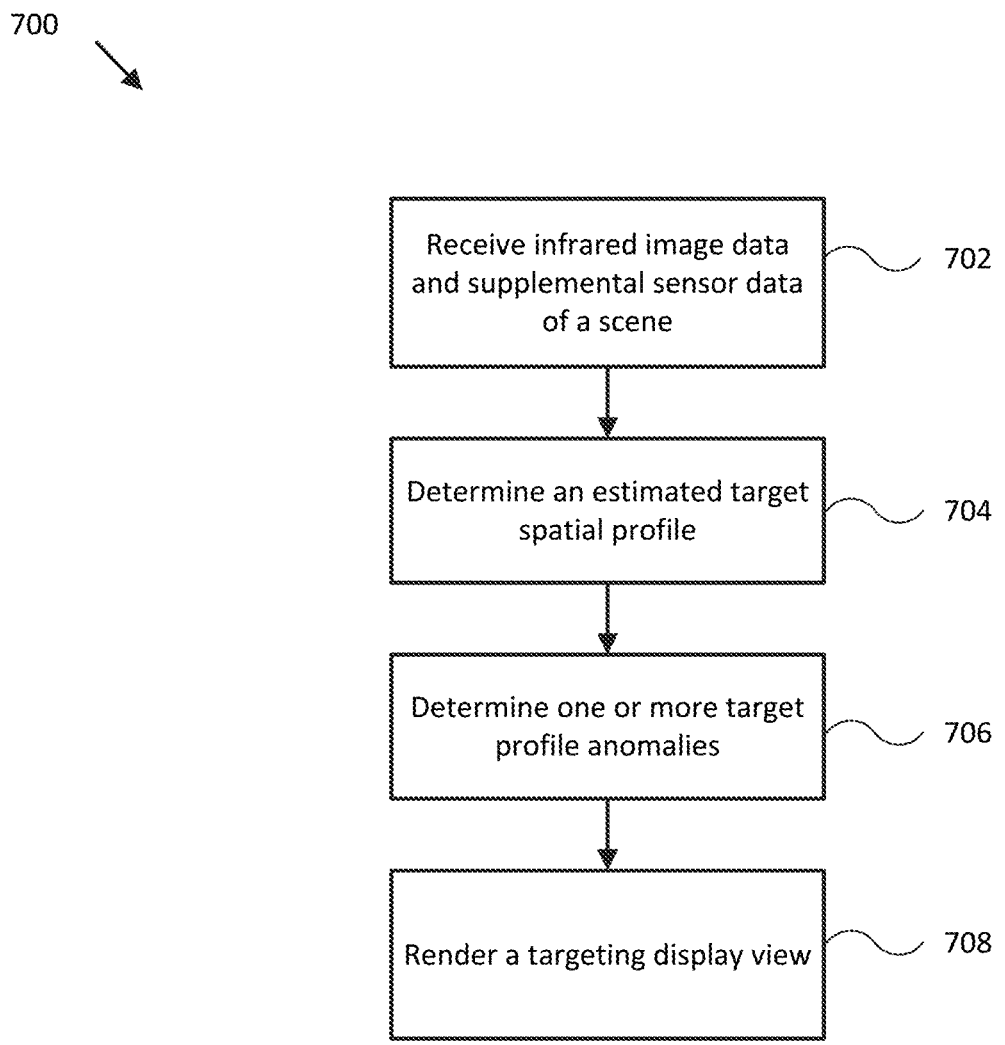
FIG. 7 illustrates a flow diagram of various operations to provide camouflage detection using a camouflage detection system in accordance with embodiments of the disclosure.

FIG. 7 illustrates a flow diagram 700 of various operations to detect a camouflaged target using a camouflage detection system in accordance with embodiments of the disclosure. In some embodiments, the operations of FIG. 7 may be implemented as software instructions executed by one or more logic devices or controllers associated with corresponding electronic devices, sensors, and/or structures depicted in FIGS. 1-3. More generally, the operations of FIG. 7 may be implemented with any combination of software instructions, mechanical elements, and/or electronic hardware (e.g., inductors, capacitors, amplifiers, actuators, or other analog and/or digital components).

It should also be appreciated that any step, sub-step, sub-process, or block of process 700 may be performed in an order or arrangement different from the embodiments illustrated by FIG. 7. For example, in other embodiments, one or more blocks may be omitted from or added to each individual process. Furthermore, block inputs, block outputs, various sensor signals, sensor information, calibration parameters, and/or other operational parameters may be stored to one or more memories prior to moving to a following portion of a corresponding process. Although process 700 is described with reference to systems and/or display views described in FIGS. 1-6, process 700 may be performed by other systems different from those systems and including a different selection of electronic devices, sensors, assemblies, mechanisms, platforms, platform attributes, and/or display view elements.

At block 702, infrared image data and supplemental sensor data is received. For example, controllers 112, 312, and/or 372, communication modules 120, 144, and/or 134, user interface 132, and/or other elements of system 100 may be configured to receive infrared image data 542 of a scene from imaging system 140 and supplemental sensor data 544 of the scene from a supplemental sensor system, such as from a different imaging module of imaging system 140 or from ranging sensor system 128. In other embodiments, system 100 may be configured to receive supplemental sensor data 544 from a supplemental sensor system coupled to a different platform (e.g., platforms 110A-Z) positioned and/or oriented differently from imaging system 140 of platform 110.

In a particular embodiment, supplemental sensor data 544 of the scene includes ultraviolet image data and/or visible spectrum image data of the scene, the supplemental sensor system is implemented by an ultraviolet imaging module and/or a visible spectrum imaging module configured to provide the ultraviolet image data and/or visible spectrum image data of the scene, and the ultraviolet image data and/or the visible spectrum image data of the scene incudes at least a portion of camouflaged target 560, as shown in FIG. 5. In some embodiments, the ultraviolet imaging module and/or the visible spectrum imaging module of the supplemental sensor system (e.g., imaging modules 142 and/or 342 are integrated with the imaging system (e.g., imaging system 140 and/or 340). Such imaging system may in some embodiments be mounted to mobile platform 110.

In another particular embodiment, supplemental sensor data 544 of the scene includes ranging sensor data of the scene, the supplemental sensor system is implemented by ranging sensor system 128 configured to provide the ranging sensor data of the scene, and the ranging sensor data of the scene includes at least a portion of camouflaged target 560, as shown in FIG. 5. In various embodiments, ranging sensor system 128 may be mounted to the same platform as imaging system 140 (e.g., platform 110), to a different platform from imaging system 140 (e.g., platforms 110A-Z), and/or to a stationary or mobile platform.

In block 704, an estimated target spatial profile is determined. For example, system 100 may be configured to determine estimated target spatial profile 562 corresponding to camouflaged target 560 based, at least in part, on the infrared image data 542 of the scene received in block 702. In some embodiments, system 100 may be configured to determine estimated target spatial profile 562 by identifying a spatially connected, localized, and/or substantially uniform portion of infrared image data 542, for example, and using such identified portion of infrared image data 542 as estimated target spatial profile 562. In other embodiments, system 100 may be configured to select a target model dataset of a target model database as estimated target spatial profile 562 based, at least in part, on the identified portion of infrared image data and the target model database, such as by CNN based image element and/or pattern matching, as described herein.

In block 706, one or more target profile anomalies are determined. For example, system 100 may be configured to determine one or more target profile anomalies 564, 565 based, at least in part, on estimated target spatial profile 562 determined in block 704 and supplemental sensor data 544 received in block 702. In some embodiments, system 100 may be configured to determine a second estimated target spatial profile 572 based, at least in part, on supplemental sensor data 544 of the scene received in block 702, for example, and to determine target profile anomalies 564, 565 based, at least in part, on a spatial difference between first estimated target spatial profile 562 and second estimated target spatial profile 572, as shown in FIGS. 5-6B.

In block 708, a targeting display view is rendered. For example, system 100 may be configured to render targeting display view 600 including infrared image data 642 or supplemental sensor data 544 of the scene received in block 702, on a display 333 of user interface 130, 230, and to render target profile anomalies 564, 565 determined in block 706 as visually differentiated portions 664, 665 of targeting display view 600. In other embodiments, system 100 may be configured to scale, rotate, translate, and/or otherwise register infrared image data 542 received in block 702 and/or supplemental sensor data 544 received in block 702 to each other and to render targeting display view 602 comprising infrared image data 542 and at least portion 674 of supplemental sensor data 544 on a display 333 of user interface 130, 230, where portion 674 of supplemental sensor data 544 corresponds to camouflaged target 560 and/or the one or more target profile anomalies 564, 565 determined in block 706.

By providing such systems and techniques for camouflage detection, embodiments of the present disclosure substantially improve the operational flexibility and reliability of camouflage detection systems, including systems mounted to mobile and/or unmanned sensor platforms. Moreover, such systems and techniques may be used to increase the operational safety of users and operators of mobile platforms, including of unmanned mobile sensor platforms, beyond that achievable by conventional systems. As such, embodiments provide camouflage detection systems and navigation systems with significantly increased operational convenience and performance.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A system comprising:
an imaging system, wherein the imaging system comprises an infrared imaging module configured to provide infrared image data of a scene comprising a camouflaged target in view of the imaging system; and
a logic device configured to communicate with the imaging system and a supplemental sensor system configured to provide supplemental sensor data of the scene, wherein the logic device is configured to:
receive the infrared image data of the scene from the imaging system and the supplemental sensor data of the scene from the supplemental sensor system;
determine an estimated target spatial profile corresponding to the camouflaged target based, at least in part, on the infrared image data of the scene; and
determine one or more target profile anomalies based, at least in part, on one or more discrepancies between the estimated target spatial profile and the supplemental sensor data of the scene.

2. The system of claim 1, wherein the determining the estimated target spatial profile comprises:
identifying a spatially connected, localized, and/or substantially uniform portion of the infrared image data; and
selecting a target model dataset of a target model database as the estimated target spatial profile based, at least in part, on the identified portion of the infrared image data and the target model database.

3. The system of claim 1, further comprising a user interface comprising a display, wherein the logic device is configured to:
render a real time targeting display view comprising the estimated target spatial profile and the infrared image data overlaid on the supplemental sensor data of the scene on the display, wherein the supplemental sensor data comprises a lidar image; and
render the determined one or more target profile anomalies as visually differentiated portions of the targeting display view.

4. The system of claim 1, wherein the logic device is configured to:
scale, rotate, translate, and/or otherwise register the infrared image data and/or the supplemental sensor data of the scene to each other; and
render a targeting display view comprising the infrared image data and at least a portion of the supplemental sensor data of the scene on a display of a user interface, wherein the portion of the supplemental sensor data of the scene corresponds to the camouflaged target and/or the determined one or more target profile anomalies.

5. The system of claim 1, wherein the estimated target spatial profile comprises a first estimated target spatial profile, and wherein the determining the one or more target profile anomalies comprises:
determining a second estimated target spatial profile based, at least in part, on the supplemental sensor data of the scene; and
determining the one or more target profile anomalies based, at least in part, on a spatial difference between the first estimated target spatial profile and the second estimated target spatial profile.

6. The system of claim 5, wherein:
the imaging system is mounted to a first mobile platform; and
the supplemental sensor system is mounted to a second mobile platform.

7. The system of claim 1, wherein:
the supplemental sensor data of the scene comprises ultraviolet image data and/or visible spectrum image data of the scene;
the supplemental sensor system comprises an ultraviolet imaging module and/or a visible spectrum imaging module configured to provide the ultraviolet image data and/or visible spectrum image data of the scene; and
the ultraviolet image data and/or the visible spectrum image data of the scene comprises at least a portion of the camouflaged target.

8. The system of claim 7, wherein:
the ultraviolet imaging module and/or the visible spectrum imaging module of the supplemental sensor system are integrated with the imaging system; and
the imaging system is mounted to a mobile platform.

9. The system of claim 1, wherein:
the supplemental sensor data of the scene comprises ranging sensor data of the scene;
the supplemental sensor system comprises a ranging sensor system configured to provide the ranging sensor data of the scene; and
the ranging sensor data of the scene comprises at least a portion of the camouflaged target.

10. The system of claim 9, wherein:
the ranging sensor system of the supplemental sensor system is mounted to a mobile platform.

11. A method comprising:
receiving infrared image data and supplemental sensor data of a scene comprising a camouflaged target from an imaging system comprising an infrared imaging module configured to provide the infrared image data and from a supplemental sensor system configured to provide the supplemental sensor data;
determining an estimated target spatial profile corresponding to the camouflaged target based, at least in part, on the infrared image data of the scene; and
determining one or more target profile anomalies based, at least in part, on one or more discrepancies between the estimated target spatial profile and the supplemental sensor data of the scene.

12. The method of claim 11, wherein the determining the estimated target spatial profile comprises:
identifying a spatially connected, localized, and/or substantially uniform portion of the infrared image data; and
selecting a target model dataset of a target model database as the estimated target spatial profile based, at least in part, on the identified portion of the infrared image data and the target model database.

13. The method of claim 11, further comprising:
rendering a real time targeting display view comprising the estimated target spatial profile and the infrared image data overlaid on the supplemental sensor data of the scene on a display of a user interface, wherein the supplemental sensor data comprises a lidar image; and
rendering the determined one or more target profile anomalies as visually differentiated portions of the rendered targeting display view.

14. The method of claim 11, further comprising:
scaling, rotating, translating, and/or otherwise registering the infrared image data and/or the supplemental sensor data of the scene to each other; and
rendering a targeting display view comprising the infrared image data and at least a portion of the supplemental sensor data of the scene on a display of a user interface, wherein the portion of the supplemental sensor data of the scene corresponds to the camouflaged target and/or the determined one or more target profile anomalies.

15. The method of claim 11, wherein the estimated target spatial profile comprises a first estimated target spatial profile, and wherein the determining the one or more target profile anomalies comprises:
determining a second estimated target spatial profile based, at least in part, on the supplemental sensor data of the scene; and
determining the one or more target profile anomalies based, at least in part, on a spatial difference between the first estimated target spatial profile and the second estimated target spatial profile.

16. The method of claim 15, wherein:
the imaging system is mounted to a first mobile platform; and
the supplemental sensor system is mounted to a second mobile platform.

17. The method of claim 11, wherein:
the supplemental sensor data of the scene comprises ultraviolet image data and/or visible spectrum image data of the scene;
the supplemental sensor system comprises an ultraviolet imaging module and/or a visible spectrum imaging module configured to provide the ultraviolet image data and/or visible spectrum image data of the scene; and
the ultraviolet image data and/or the visible spectrum image data of the scene comprises at least a portion of the camouflaged target.

18. The method of claim 17, wherein:
the ultraviolet imaging module and/or the visible spectrum imaging module of the supplemental sensor system are integrated with the imaging system; and
the imaging system is mounted to a mobile platform.

19. The method of claim 11, wherein:
the supplemental sensor data of the scene comprises ranging sensor data of the scene;
the supplemental sensor system comprises a ranging sensor system configured to provide the ranging sensor data of the scene; and
the ranging sensor data of the scene comprises at least a portion of the camouflaged target.

20. The method of claim 19, wherein:
the ranging sensor system of the supplemental sensor system is mounted to a mobile platform.

\* \* \* \* \*